July 23, 1968  P. A. DALE ETAL  3,393,867
TYPE OF OPERATION SEQUENCE MECHANISM FOR BUSINESS MACHINES
Filed June 20, 1966  9 Sheets-Sheet 1

INVENTORS
PAUL A. DALE &
COURTNEY H. VANN
BY
THEIR ATTORNEYS

INVENTORS
PAUL A. DALE &
COURTNEY H. VANN

THEIR ATTORNEYS

July 23, 1968    P. A. DALE ETAL    3,393,867
TYPE OF OPERATION SEQUENCE MECHANISM FOR BUSINESS MACHINES
Filed June 20, 1966    9 Sheets-Sheet 4

INVENTORS
PAUL A. DALE &
COURTNEY H. VANN

BY  Louis A. Kline
    Wilbert Hawk, Jr.

THEIR ATTORNEYS

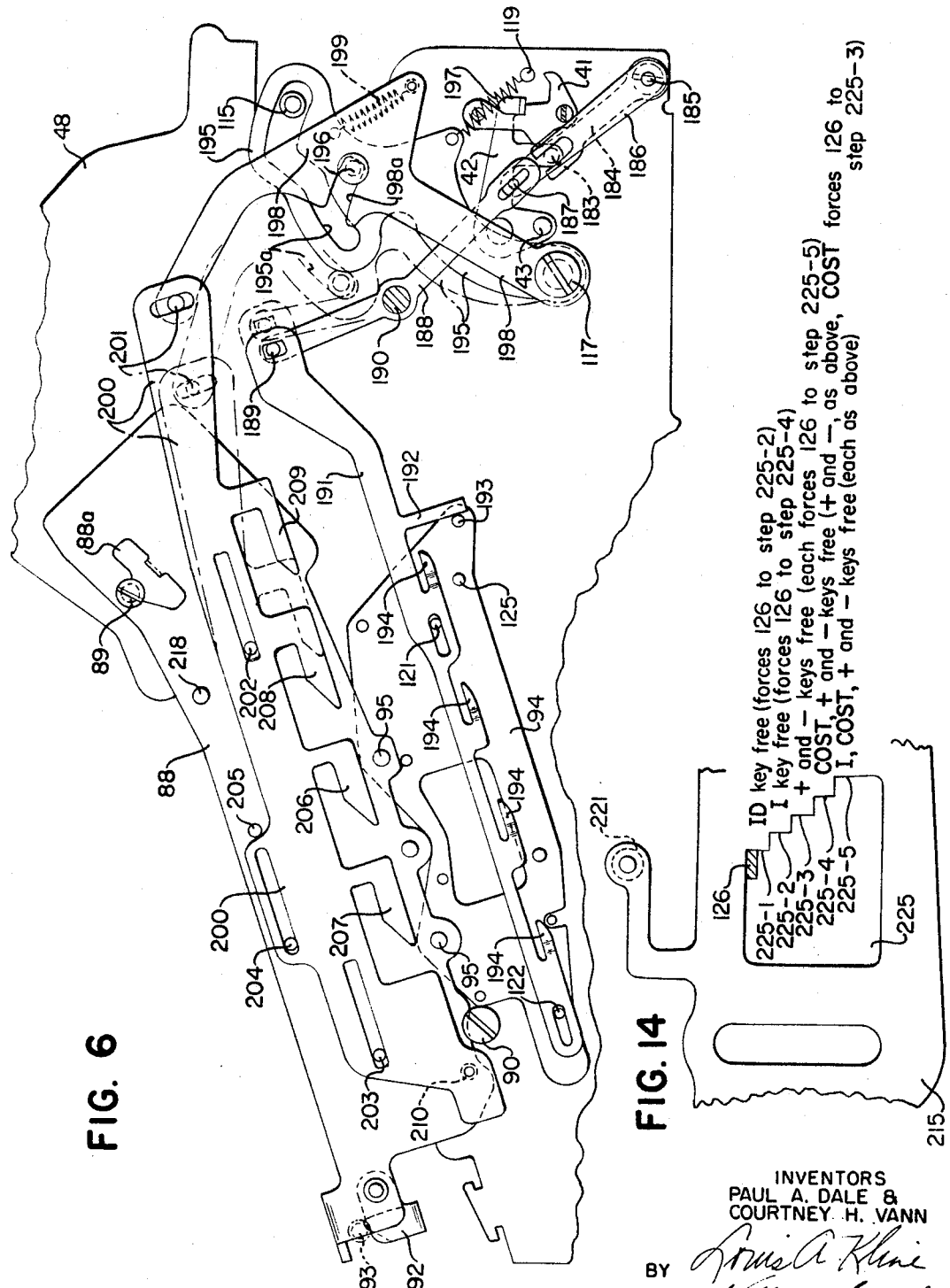

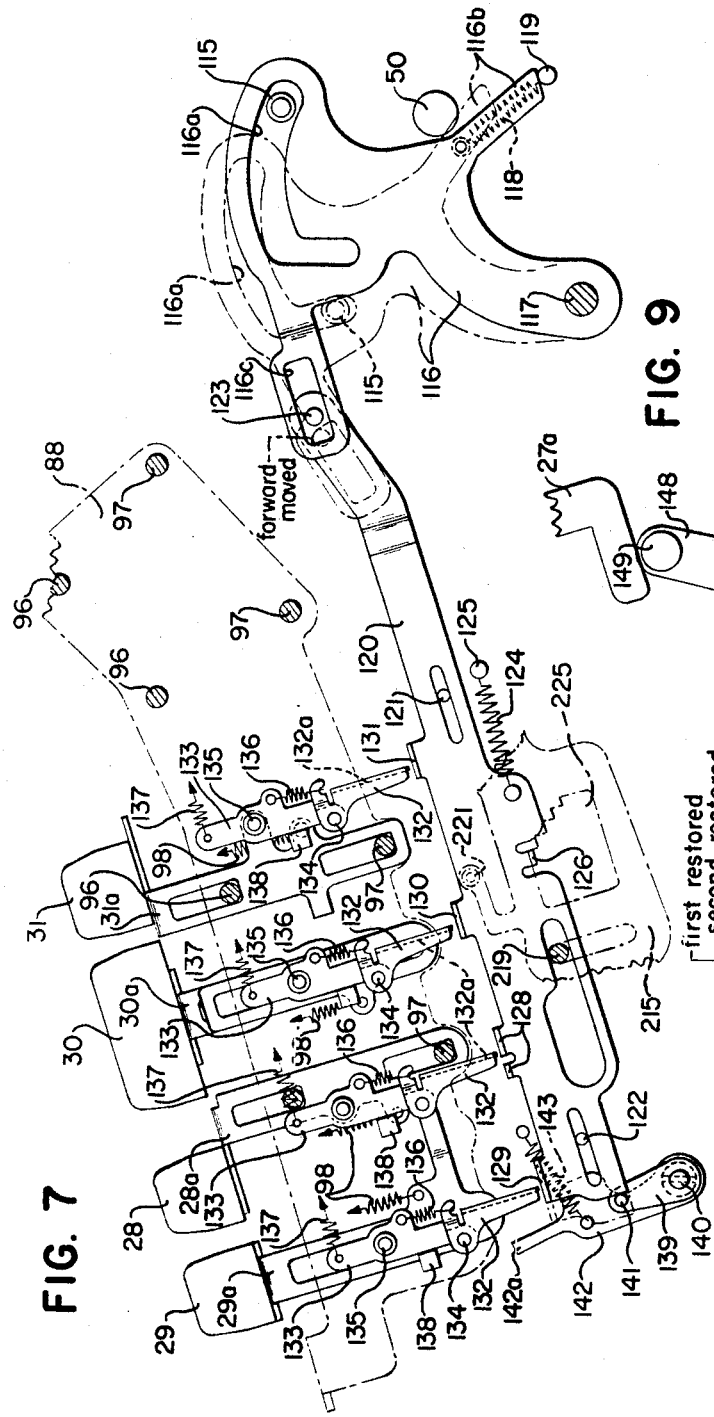

INVENTORS
PAUL A. DALE &
COURTNEY H. VANN

BY

THEIR ATTORNEYS

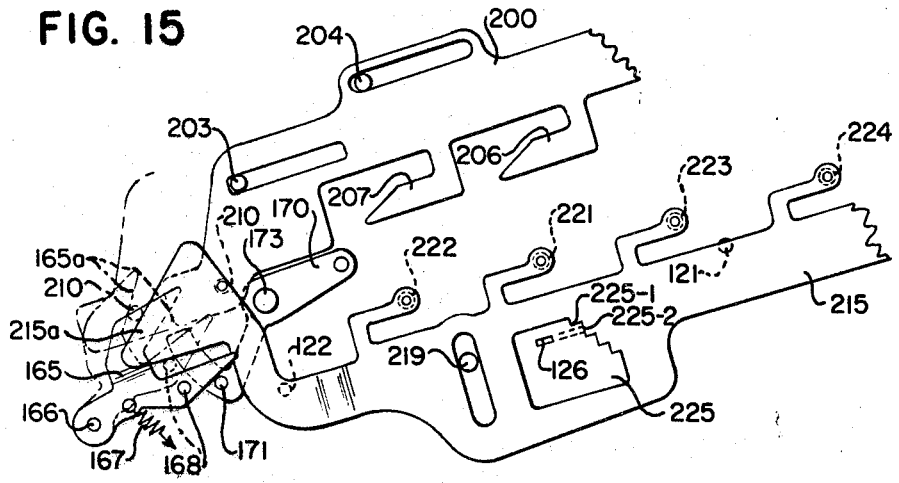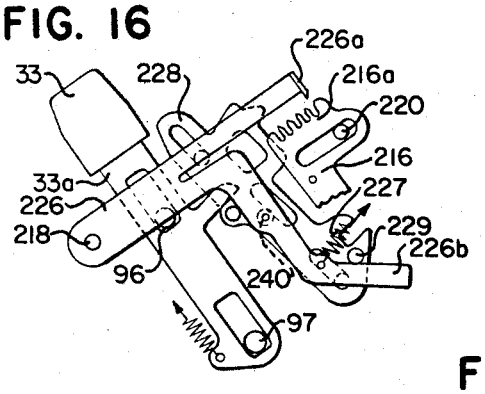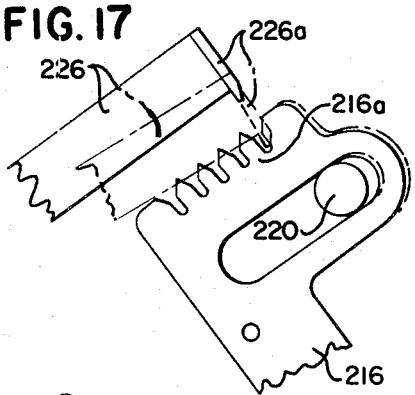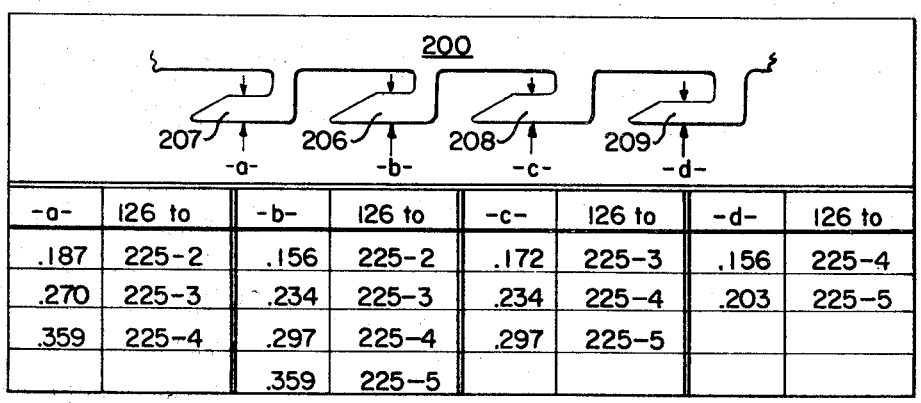
INVENTORS
PAUL A. DALE &
COURTNEY H. VANN
THEIR ATTORNEYS United States Patent Office 3,393,867
Patented July 23, 1968

3,393,867
TYPE OF OPERATION SEQUENCE MECHANISM FOR BUSINESS MACHINES
Paul A. Dale and Courtney H. Vann, Ithaca, N.Y., assignors to The National Cash Register Company, Dayton, Ohio, a corporation of Maryland
Filed June 20, 1966, Ser. No. 558,949
22 Claims. (Cl. 235—60.49)

This invention relates generally to business machines and, more particularly, to improved type-of-operation sequence mechanism for adding, calculating, bookkeeping, and the like machines.

In the one particular embodiment of the invention as herein illustrated and described, the basic machine, other than for its carriage portion, is a two-total calculating machine of the general type disclosed in United States Letters Patent No. 2,692,726 and 2,760,722, which issued to Nelson R. Frieberg et al., respectively, on Oct. 26, 1954, and Aug. 28, 1956. While enough of the pertinent mechanism of these patents will be described herein to give what is considered a thorough understanding of the present invention, a closer study of these references may be had for a complete disclosure of the overall machine itself.

While any number of accounting and bookkeeping functions may be performed by machines of the instant type, one important application thereof lies in the ability to provide low-cost input to electronic accounting systems—such, for example, as in producing record tapes printed in a specialized "optical font" type face clearly readable both by the machine user himself and also by a reader portion of an associated tape-receiving computer arrangement. Although not limited to same, the "optical font" in question might be characteristic of that shown in United States Letters Patent Des. 188,741, issued Aug. 30, 1960, to Richard K. Gerlach and Paul M. Koons, and in United States Letters Patent Des. 200,985, issued to Richard K. Gerlach on Apr. 27, 1965.

In the preparation of such input record tapes, the precise "optical font" indicia presented thereon must, of course, follow a system compatible with the programming of the associated electronic data-processing equipment being employed. At the same time, such a record material as that prepared by the instant machine and presented for electronic processing must represent the many different forms of up-to-date business information necessary to the accounting and bookkeeping procedures followed by the great majority of progressive business concerns. Typical of this business information might be machine-prepared record tapes following posting sequences commonly used in the daily record-keeping of such things as sales—both cash and credit and new and used merchandise—parts and service, payroll, cash receipts, cash disbursements, merchandise purchases (new and used), and any other posting operation which reflects a part of the instant day's business happenings. With such detailed posting of these daily business transactions in the form of record tape readily available as direct input to the available data-processing equipment, common reports caused to be automatically prepared by such processing equipment and thence made available to the instant input machine user includes any number of journals (sales, service, payroll summary, etc.), accounts receivable statements accounts payable statements, general ledger accounts, and numerous analysis and other reports necessary to a successful business operation.

In view of the great variety of business transactions needed to be prepared in the "optical font" record tape form for input into available data-processing equipment, which in turn has been appropriately programmed for providing particular statements, ledgers, journals, analysis records, and other up-to-date information essential to effective business forecasting, it is clear that the business machine employed for input tape preparation must provide for any number of posting sequences, yet each being precisely defined with required step-by-step machine operation when once the controlling stage thereof has been entered into by the machine operator. Following such a needed sequence of machine operation requirement with permitted flexibility necessary for listing all varieties of pertinent accounting information regarding daily business operations, it is the primary object of the present invention to provide a type-of-operation sequence mechanism permitting simple, easy-to-follow, record-tape-preparing operations of the user's daily business transactions—including the transfer into electronic data-processing equipment (reader) language of all hand-prepared sales, service, credit, and like record slips included in the daily business operation.

An additional and important object of the invention resides in the provision of such mechanism defining a precise type-of-operation sequence requirement which includes some degree of selectivity in machine operation at a particular stage in sequence.

A further important object of the invention resides in such sequence mechanism permitting the business machine employing it to be operated with extreme accuracy for the purposes intended by a machine operator not having or requiring any special training and the like.

Still a further important object of the present invention resides in the provision of mechanism for the purposes intended, yet mechanism capable with extremely simple modification of presenting further possible sequence arrangements for later and perhaps entirely different machine application having particular need for some degree of type-of-operation sequence control.

With these and incidental objects in view, the invention includes certain novel features of construction and combinations of parts, a preferred form or embodiment of which is hereinafter described with reference to the drawings accompanying and forming a part of this specification.

Of said drawings:

FIG. 6 is a view in right side elevation of selector lever positioning and sequence interlock slide portions of the instant invention;

FIG. 7 is a view in right side elevation of transaction key mounting and sequence control slide portions of the instant invention;

FIG. 8 is a detail, on an enlarged scale, of the driving connection between the sequence control slide and associated actuating arm of FIG. 7;

FIG. 9 is a detail view in left side elevation of a transaction key blocking mechanism portion of the instant invention;

Figure 1:
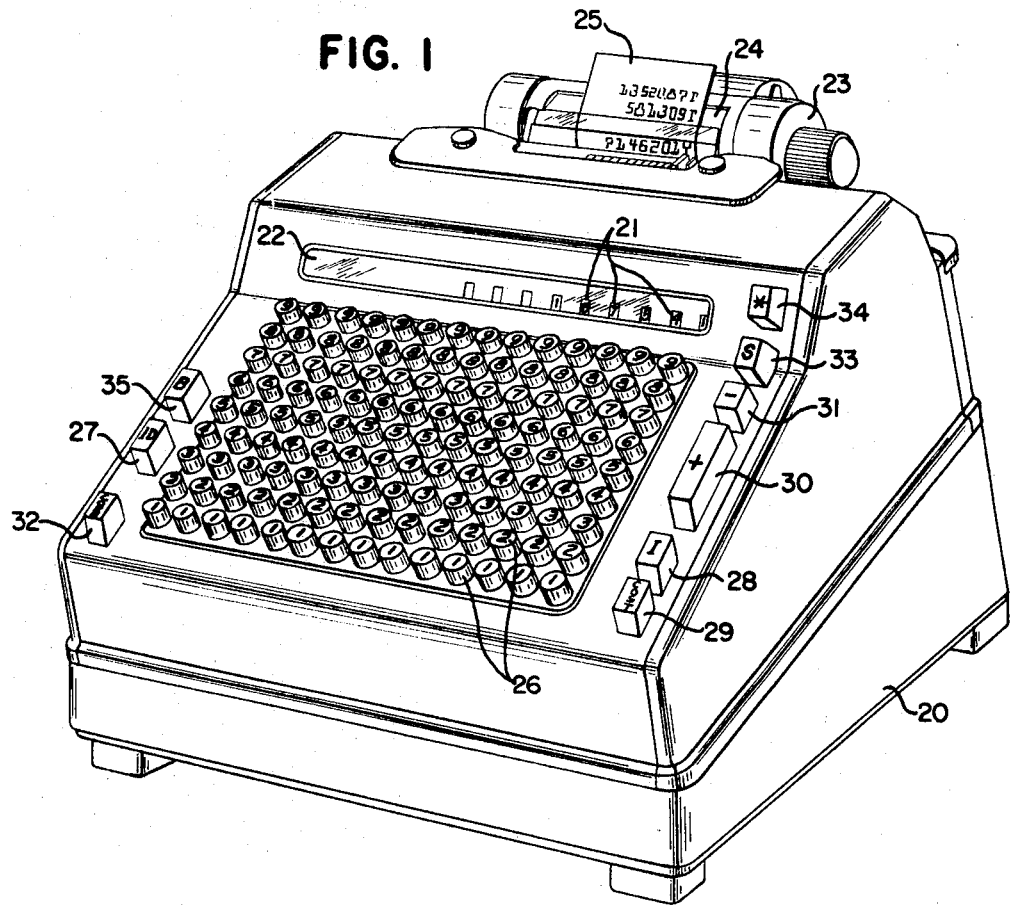
FIG. 1 is a front perspective view of a calculating machine embodying the present invention.

FIG. 14, on the sheet containing FIG. 6, is an enlarged fragmentary detail of the type of machine operation controlling portion of the sequence selector sector portion of the instant invention, showing in particular the overall range of sequence combination permissible under the present disclosure of the preferred form of the invention;

FIG. 15 is a detail view, as seen from the right, of fragmentary forward portions of the sequence selector sector and selector lever positioning portions of the instant invention, and including a sequence selector lever as associated therewith for advancing from the first to the second stage of machine operation required within the overall sequence arrangement employed;

FIG. 16 is a detail of the sub-total transaction key of the business machine being employed, including associated interlock mechanism for holding the sequence position previously attained throughout and beyond sub-totalling machine operations;

FIG. 17 is a detail, on an enlarged scale, of the interlock mechanism portion of FIG. 16; and FIG. 18 is an illustration in graphic form of possible variations in heights of camming feet of the selector lever positioning portion of the instant invention to enforce different sequences of operation through precise positioning thereby of the associated sequence selector sector portion of the invention.

GENERAL MACHINE DESCRIPTION

As set out in each of the above-mentioned reference United States patents to Frieberg et al., Nos. 2,692,726 and 2,760,722, the calculating machine embodying the present invention includes the usual housing or casing 20 (FIG. 1), which in turn is secured to a machine base member or the like for supporting the overall framework of the machine. Upper totalizer mechanism and lower totalizer mechanism are provided in the machine construction, being designated generally as totalizers A and B in FIG. 5, and at least one of such totalizers may have, as seen in both FIGS. 1 and 5, associated indicator wheels 21, which are visible through a viewing aperture 22 provided in the casing 20. A paper carriage 23 lies adjacent the upper rear of the machine to present the usual platen 24 to support listing tape 25 for receiving printed impressions of item amounts and other indicia entered into the machine. As mentioned previously, the record hereby caused to be made on the tape 25 is of the human and machine readable type, commonly referred to as having "optical font" characteristics.

Looking further to FIG. 1, the machine is provided with a plurality of rows of digit keys 26, each row containing nine keys to represent the digits "1" to "9," inclusive; an add motor bar, control key, or transaction key 30 for initiating a machine operation in which data set up on the digit keys 26 is entered additively into the several totalizer mechanisms (A and B); a subtract control or transaction key 31 for initiating a machine operation in which data set up on the digit keys 26 is entered subtractively into the A totalizer mechanism and, at the same time, additively into the B totalizer mechanism; a correction key 32 for returning all depressed digit keys 26 to an unoperated condition prior to the initiation of a machine operation; a sub-total control or transaction key 33, depression of which initiates a machine operation in which the data accumulated in the A totalizer is printed on the tape 25; a total control or transaction key 34, depression of which initiates a machine operation in which the data accumulated in the A totalizer is cleared therefrom and printed on the tape 25; and a B control or transaction key 35, which, when depressed followed by depression of either the sub-total control key 33 or the total control key 34, causes the machine operation initiated through the latter sub-total and total keys to take, as the case may be, either a sub-total or a total from the B totalizer mechanism and print it also on the tape 25. In the usual and well-known manner, non-add control keys may also be included in the basic machine structure for initiating machine operations in which data set up on the digit keys 26 is printed on the listing tape 25 but is not entered into the totalizer mechanism provided. For the instant embodiment of the present invention, three of such non-add keys are also provided in the overall keyboard makeup of the machine in question (FIG. 1), being a keyboard left side non-add control or transaction key 27, specifically designated as an ID key; a keyboard right side non-add control or transaction key 28, specifically designated as an I key; and a further keyboard right side non-add control or transaction key 29, specifically designated as a "COST" key. As is clear from FIG. 1, the key 27 is aligned with and lies between the "Correction" and B control keys 32 and 35, the key 28 is aligned with and lies immediately below the add motor bar 30, and the key 29 is aligned with and lies immediately below the key 28. While the precise function of each of these non-add control keys 27, 28, and 29, as so included in the basic machine embodying the present invention, will be discussed in more detail later in the specification, a slight deviation in totalizer control thereunder is specified herein to non-add the A totalizer in the usual manner, but, for the purpose of maintaining a "hash" or "grand" total containing each and every machine operation performed, to also permit the digit-key-26-designated amount to be added to the B totalizer.

Figure 3:
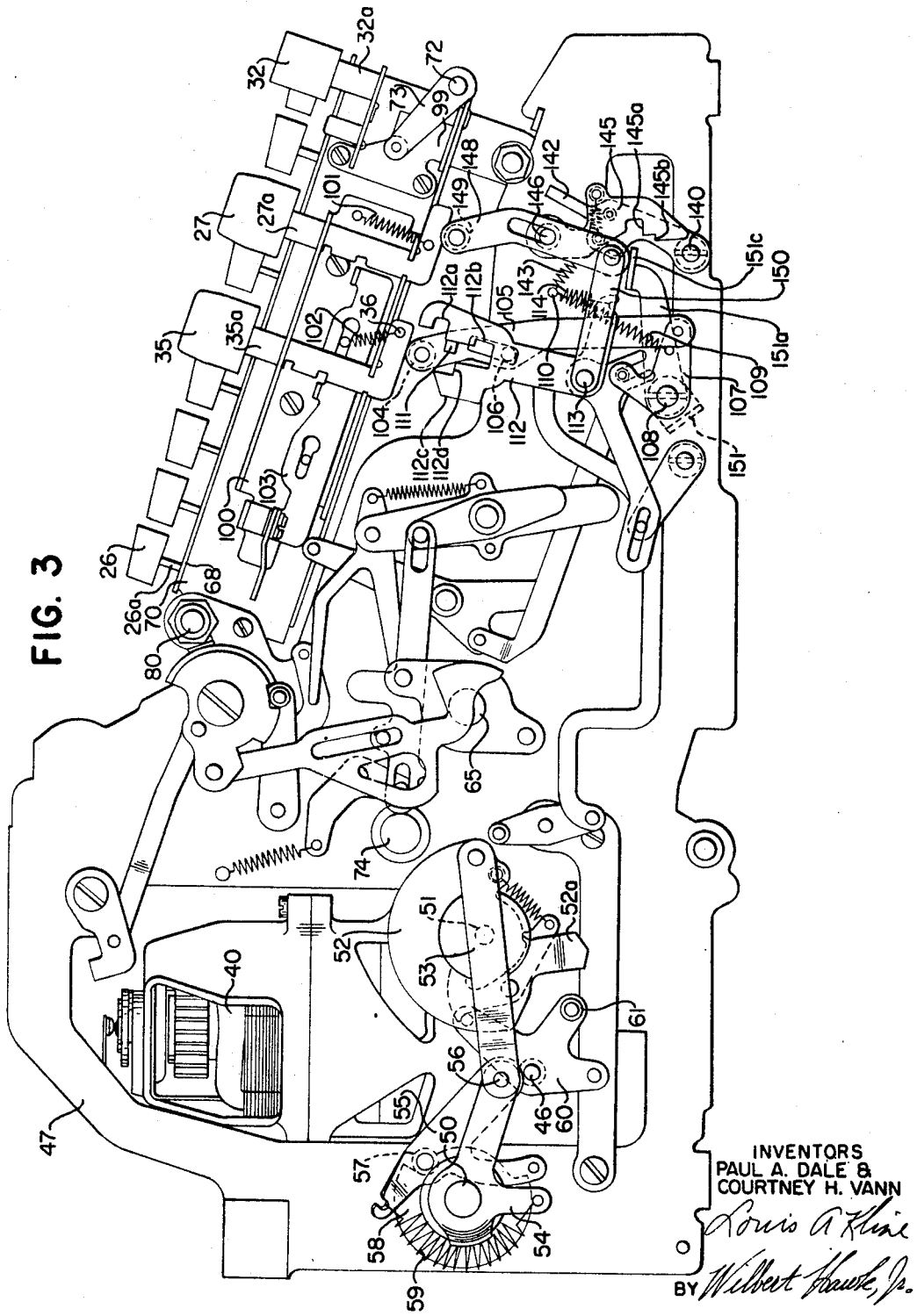
FIG. 3 is a view in elevation of the left side of the calculating machine, with the cabinet removed and with particular reference to that part of the mechanism thereof which is located on the outside of the left vertical frame plate.
Figure 5:
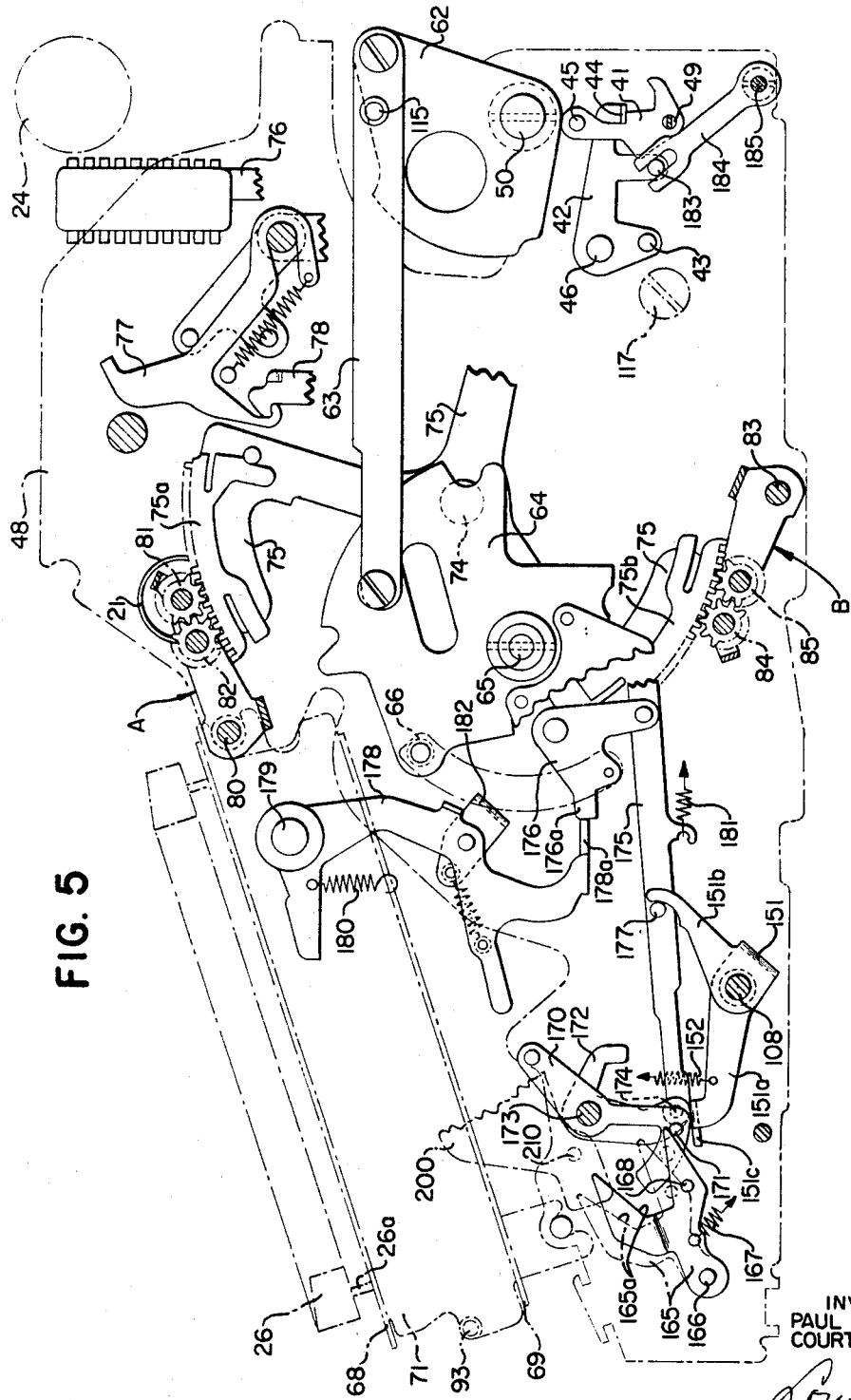
FIG. 5 is an elevational view in partial section as seen from the right-hand side of the machine, showing in fragmentary form or like partial illustration the machine keyboard, the trip mechanism, the oscillating drive mechanism, the differential mechanism, the printer mechanism, the totalizer mechanisms, and certain controls relating to the particular sequence mechanism hereof.
Figure 13:
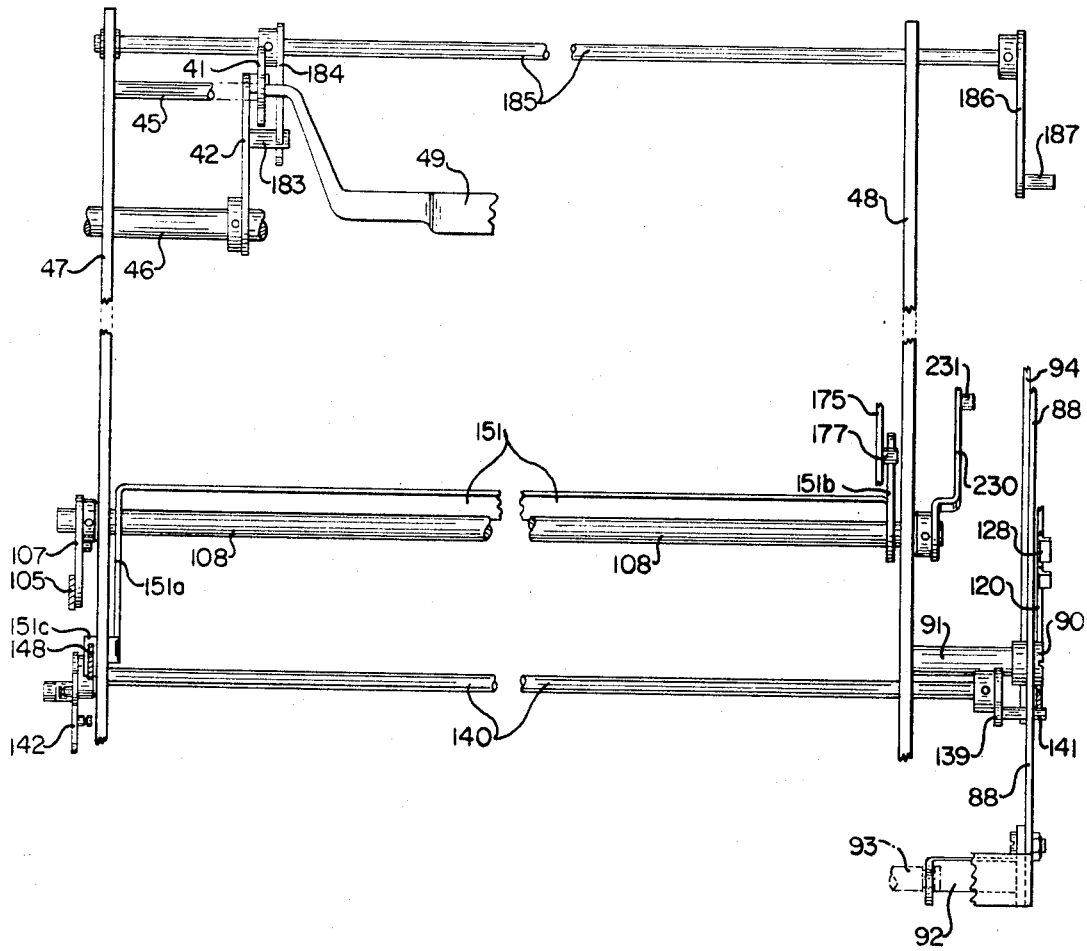
FIG. 13 is a fragmentary top plan view, looking down upon the right and left vertical frame plates of the machine and showing in particular with relation thereto the principal portions of the instant invention.

Referring to FIGS. 3 and 5, the calculating machine is driven through cycles of operation by an electric motor 40, which operates upon the closing of a trip switch (not shown) included in the construction of associated cycle initiating mechanism. As is known from each of the reference patents, the switch is closed whenever a trip latch releases its hold on an associated multiple-armed lever 42, so that it may be permitted to rock clockwise that extent where a lower stud 43 thereof effectively actuates the usual switch operating lever. Referring also to FIG. 13, the trip latch 41 is pivotally mounted on a stud 45 extending inwardly from a machine left vertical frame plate 47. The multiple-armed lever 42 is pinned to a shaft 46 extending between the frame plate 47 and a companion right vertical frame plate 48 of the machine general framework construction. Although not illustrated herein, the lever 42 is constantly urged clockwise by an appropriate spring, but is normally restrained from so moving by the trip latch 41. Thus it is clear that, if the trip latch 41 is swung clockwise about its pivot stud 45 (as seen in FIG. 5) a distance sufficient to remove it from under a latch ear 44 of the multiple-armed lever 42, the lever 42 will likewise be turned clockwise under force of its associated spring for actuating the machine trip via movement of its lower stud 43.

Moving the trip latch 41 clockwise and to its machine-tripping position is by an outer free end portion of an associated trip lever 49, which, in the usual and well-known manner, is actuated to a trip-latch-rocking position upon the depression of any of the illustrated and previously discussed machine-cycle-initiating control or transaction keys 27 to 31 inclusive, 33, and 34. In the manner set out in detail in each of the above-mentioned United States patents of Frieberg et al., precisely designed coupling mechanism is provided for actuating the trip lever 49 upon control or transaction key depression in each instance.

Operation of the motor 40 causes a rear drive shaft 50 to oscillate first counter-clockwise and then clockwise back to its home position (FIG. 5), and in the reverse directions as seen in FIG. 3. In so doing this, the motor 40, through reduction gearing not shown herein, drives a horizontal shaft 51 counter-clockwise (FIG. 3). Operably connected to the shaft 51 is a crank plate 52, which in turn pivotally supports one end of a drive link 53. The other end of the link 53 is pivoted to a bell crank lever 54, which is mounted rotatably on the machine rear drive shaft 50. Coupling of the bell crank lever 54 to the associated shaft 50 is through a lever 55, pivoted to the bell crank lever 54 at 56, which lever 55 has a roller 57 cooperating with a notch in a drive plate 58 secured to the machine rear drive shaft 50. In the usual manner, the stud 57 is normally urged into engagement with the drive plate notch by a spring 59 extending between the outer end of the lever 55 and a downwardly-extending arm of the bell crank lever 54. This spring 59 is strong enough to hold the roller 57 in a driving condition with the driving plate 58, thus forming a drive between the bell crank lever 54 and the rear shaft 50 during all normal operations of the machine but yielding to any overload that may be placed on such machine. For the sake of perhaps better understanding future description directed specifically to the precise invention hereof, overall oscillating movement of the rear drive shaft 50 during each machine cycle of operation is in the neighborhood of one hundred and fifty-two degrees—seventy-six degrees of travel away from home and a like degree of travel in returning thereto.

Restoration of the multiple-armed lever 42 to its home, machine-non-tripped, position (FIG. 5) takes place automatically each time the machine crank plate 52 (FIG. 3) nears the end of its rotational movement. As illustrated, at this time a cam portion 52a of the crank plate 52 strikes a roller 61 carried by the downwardly and forwardly extending arm of a cycle control lever 60 secured to the outer end of the shaft 46, rocking said lever 60 a precise extent clockwise. This, as can be further understood from FIG. 5, carires the multiple-armed lever 42 therewith (counter-clockwise, as viewed from the right), thus allowing the associated trip latch 41 to freely swing under its latch ear 44 and thereafter hold it in the home position.

As mentioned previously, the machine rear drive shaft 50 oscillates first counter-clockwise and then clockwise (FIG. 5) during each machine cycle of operation. Secured to the shaft 50, adjacent the machine right vertical frame plate 48, is a drive plate 62 connected by a link 63 to the usual full-stroke sector 64 secured to a machine main shaft member 65. As illustrated in both FIGS. 3 and 5, the main shaft 65 likewise extends between and is journaled in the machine left and right vertical frame plates 47 and 48 for oscillating movement therein at a zone forward of the rear drive shaft 50. As is clear from the illustration of FIG. 5, upon commencement of a machine cycle of operation, both the drive plate 62 and the full-stroke sector 64 will first move in unison a precise extent forwardly (counter-clockwise) and be thence returned rearwardly to their home positions upon the second half of the machine cycle taking place.

For an understanding of the instant invention, it is only necessary to explain that the machine keyboard is made up of a plurality of rows of digit keys 26 (FIG. 1), which are normally out of controlling relation with associated differential mechanism provided, and which, when selectively depressed to set up precise amounts to be entered into the machine, are moved into position to control the extent of movement of the differential mechanism according to such amounts. In general, and as understood from FIGS. 3 and 5, the keyboard construction includes a top plate 68, a bottom plate 69, a left side plate 70 (FIG. 3), and a right side plate 71 (FIG. 5). The digit keys 26 are provided with key stems 26a slidably mounted in aligned slots cut in the top and bottom keyboard plates, being normally yieldingly held up in ineffective position by means of springs (not shown herein), and projecting below the bottom plate 69 as digit keys 26 are depressed for entering selected item amounts into the machine. As will be described shortly, it is the projection of the key stems 26a which controls movement of the associated differential and related mechanisms.

The usual bail member is included in the keyboard construction for latching any depressed digit key 26 in operated condition until it is released at certain times by any one of several available ways. Prior to machine operation, rocking of a key release shaft 72 (FIG. 3) for unlatching each digit key depressed may be had through actuation of the previously-mentioned correction key 32 (see also FIG. 1), which key includes a stem 32a appropriately shaped for camming counter-clockwise an associated actuating arm 73 affixed to the key release shaft 72. At a like time, prior to machine operation, depression of a second digit key 26 in any vertical row is effective to release that row key 26 depressed earlier, all in the known manner set out in detail in numerous earlier patents directed to the instant type of business machine. During machine operation, digit key 26 release takes place through automatic rocking of the key release shaft 72 near the end of the machine cycling time. This again is well known to the art and has been described in numerous earlier patents, not excluding those to Frieberg et al. referred to hereabove.

As best understood from FIG. 5, the differential mechanism used in the present invention is of the regular type including differentially-operable means provided for each denominational row of digit keys 26. Although not illustrated herein, the usual stop bar is located immediately below each row of keys 26, being allowed to move for setting an interconnected diverging lever 75 in accordance with the value of the depressed key. While being but partially shown for the sake of overall clarity in illustration, the lever 75 is pivotally mounted on a support shaft 74 and has a rearward extension to which is connected the lower end of an amount type bar 76, the latter of which, while the diverging lever 75 is being coordinated to the value of the depressed digit key 26, is itself positioned accordingly to place in printing position with respect to the associated printing platen 24 that type character corresponding to the depressed key.

Printing of the type character adjusted to the printing position is performed through release of the usual impression hammer 77, all in the manner and at the time set out in detail in the reference patents hereof. Essentially, the impression hammer 77 is spring loaded for impellment against the aligned type character, and is caused to strike the type character a sharp blow when released from an associated latch member 78 near mid-cycle of a machine operation.

The several totalizers A and B of the present machine are each of the same general construction. As illustrated (FIG. 5), the upper, or A, totalizer mechanism is supported on a shaft 80 journaled in the machine frame plates 47 and 48 (see also FIG. 3) and includes a set of totalizer pinions 81 and idler pinions 82 operably aligned for selective engagement with an upper actuating rack portion 75a of the previously discussed diverging lever 75. The lower, or B, totalizer mechanism is supported on a shaft 83 and includes a set of totalizer pinions 84 and idler pinions 85. In a like manner, such pinions are operably aligned with a lower actuating rack 75b of the diverging lever 75. Although not illustrated herein, in view of the detailed showing and discussion in the above-mentioned Frieberg et al. references, the usual totalizer engaging and disengaging mechanism is available for performing the various add, subtract, total, and sub-total types of machine operations, all in accordance with controlled operation of such mechanism as determined by the precise control or transaction keys 27, 28, 29, 30, 31, 33, and 34 selected and depressed for initiating machine operation. Through the overall mechanism, either clockwise or counter-clockwise rotation may be imparted to the totalizer pinions during each operation of the diverging levers 75, depending upon both the point of time at which and the length of time for which said pinions are caused to mesh with the associated actuating racks 75a and 75b.

TYPE-OF-OPERATION SEQUENCE MECHANISM

In general

As mentioned above, with respect to machine application to provide low-cost input for electronic accounting systems, extreme flexibility in operation of the particular business machine so employed is necessary for listing all varieties of pertinent accounting information regarding daily business operations, so as to prepare a comprehensive record printed in language readable by the electronics included within the overall data-processing equipment being used. While the understanding to be gained from the following description makes it clear that the precise sequence mechanism hereof can easily and quickly be adapted to meet any requirements of flexibility, it must be borne in mind that, for the purpose of adequate disclosure itself, a particular arrangement of the invention thoroughly described best includes a prescribed sequence of performing different types of machine operations in a regular order one after another and with a certain degree of flexibility within such order being present and available whenever needed. An example of a typical such arrangement is that embodied in the machine of the instant invention, as schematically illustrated in the keyboard representation of FIG. 2.

Figure 2:
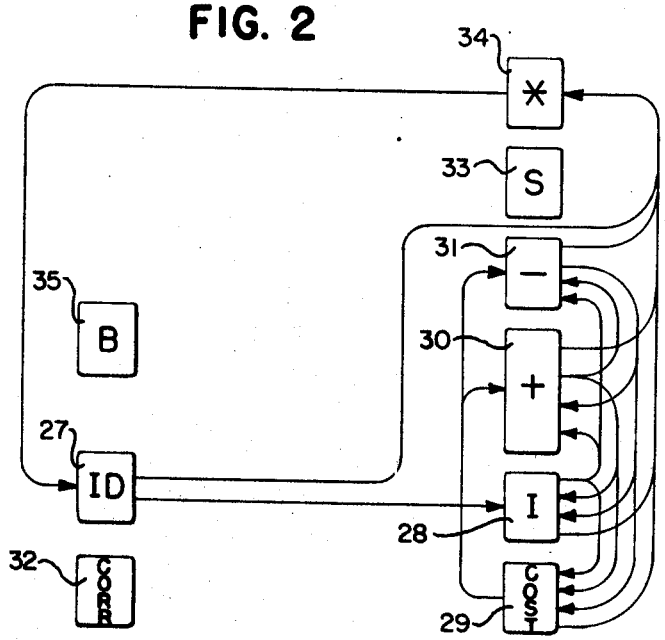
FIG. 2 is a diagrammatic representation of the type-of-operation keyboard arrangement and overall sequence control embodied in the machine of FIG. 1.

Looking to FIG. 2, it should be understood that the start of the particular sequence hereof can begin with depression of, and only of, the ID transaction key 27. That is to say, none but the ID key 27 is effective for starting a new sequence at any time—the reason being that said key 27 is the only one at this time effective for initiating a machine operation of the digit-entering type. Each of the remaining digit-entering transaction keys—namely, the subtract key 31, the add key 30, the I key 28, and the COST key 29—is effectively locked by precise means hereinafter described against operation at such time. The total transaction key 34 is, of course, likewise free for depression at such time but, as illustrated, is only effective for returning the machine to a sequence-starting or key 27 pre-depressed condition. It is thus clear that depression of the total transaction key 34 in each instance requires the start of a new sequence, which itself can only begin through depression of the then free ID transaction key 27.

Following the direction of the arrows in FIG. 2, the next key available for depression after the key 27 is the I transaction key 28. The total transaction key 34 is, of course, again free and clear for depression, but, as above, rather than advancing the sequence, has the effect of requiring the sequence to be started again. Through precise interlock mechanism described hereinafter, this forced sequence move from the ID key 27 to the I key 28 is due to the fact that the key 28 is now the only data-entering transaction key available for depression; i.e., not being in a locked-out condition. As the ID key 27 is considered a non-repeat type of key, it becomes locked against further depression during the first machine operation initiated thereunder, and, while such machine operation is further effective for unlocking the next-in-order I key 28, nothing thereduring changes the original locked-out condition of the remaining data-entering transaction keys 29, 30, and 31.

The machine operation initiated under control of the I transaction key 28 is likewise effective for preventing a repeat operation from being initiated through the same key 28, but, unlike the previous unlocking of but a single key for initiating the next machine operation (key 28 via key 27), the machine operation initiated through the I key 28 is effective to now unlock for operation any one of the cost, add, or subtract transaction keys 29, 30, and 31, respectively. While the machine operator cannot further depress either the ID key 27 or the I key 28 at this time (same having been used to initiate the first and second machine operations within the particular sequence under consideration), it is clear that a considerable degree of flexibility in the overall sequence is now permitted, as any one of the three further data-entering keys 29, 30, and 31 can at this time be selected and depressed for initiating the next machine operation.

In recalling earlier discussion directed to the machine keyboard of FIG. 1, the COST transaction key 29 is likewise effective when depressed to initiate a non-add type of machine operation—where the prime purpose of the digit-key-26-designated amount is to have the amount printed on the listing tape 25. Following again the arrows of FIG. 2, it is seen that operator selection of the key 29 at this time (rather than either of the alternative keys 30 and 31) initiates a third machine operation within the overall sequence, during which the next succeeding machine operation (fourth) is preconditioned to then take place through depression of either the add motor bar 30 or the subtract transaction key 31—both remaining unlocked for fourth machine operation use within the sequence under direction of the sequence third machine operation just initiated through the COST key 29. As was the case during each of the sequence first and second used transaction keys 27 and 28, the total transaction key 34 remains continually available for clearing out from the machine totalizers what thus far has been done and starting the sequence again wherever desired.

Should, rather than selecting the COST key 29 for advancing the sequence through its third machine operation, the operator select one or the other of the likewise available keys 30 and 31, the digit amount then set up on the keys 26 (FIG. 1) is in each instance entered into the machine totalizer mechanisms accordingly. Depression of the add motor bar 30 for machine operation at this time causes the keyboard-contained digit amount to be entered additively both to the A and B totalizer mechanisms. On the other hand, depression of the subtract key 31 for initiating machine operation causes said keyboard amount to be entered additively to the B totalizer mechanism and subtractively to the A totalizer mechanism.

In either instance—that is, depression of key 30 or key 31 for performing the fourth machine operation within the overall sequence—a fifth machine operation within the sequence may next be initiated through depression of one of the keys 30 and 31 not previously depressed for completing the sequence fourth machine operation, through depression of the previously used I transaction key 28, through depression of the COST transaction key 29 (whether previously used or not), or through depression of the regularly available total transaction key 34. Any such fifth machine operation initiated through the total key 34, of course, ends the sequence in progress and requires a new one to be next started through the ID key 27 only. Any such fifth machine operation initiated through the likewise available I transaction key 28 again preconditions a succeeding machine operation to follow that path described previously—through either of the keys 29, 30, 31, and 34, with succeeding machine operations in turn following that path prescribed for the particular one of the keys selected and depressed. This is likewise true for the fifth machine operation within the sequence being initiated through depression of the COST key 29, which enables a succeeding machine operation to be thence initiated through either the add key 30, the substract key 31, or the total key 34, with still a further machine operation within the sequence perhaps permitted under control of the particular one of the available keys selected.

As described earlier, during discussion of the transaction keys 27 and 28, the keys available for initiating a next machine operation within the sequence are those which have, during the preceding machine operation, become unlocked and thus made available for depression. This may be from one to three data-entering-type transaction keys, all as representatively illustrated in FIG. 2. The correction key 32 is, of course, always available for depression for the "key-release" purpose intended (releasing the whole of the depressed digit keys 26) and thus has nothing to do with the operation of the sequence mechanism being herein presented.

Both the sub-total transaction key 33 and the B transaction key 35 are likewise unlocked and free for depression at any time prior to machine cycling. As is clear from FIG. 2, neither of such keys is designated to advance nor affect the status of sequence in any way. To the contrary, and as will be described in detail later in the specification, precise mechanism is associated with each of such keys to insure a hold in that stage of the sequence immediately attained through the previous machine operation. This is to say that depression of the sub-total transaction key 33, either alone or in conjunction with the B transaction key 35, will not affect the previously gained sequence condition of the machine. In a like manner, while depression of the total transaction key 34 alone will be effective to return the machine to a sequence-starting position, any prior depression of the B key 35 therewith will have the contrary, sequence-holding, effect.

To summarize, the instant sequence of FIG. 2 might best be remembered upon saying that depression of the continually available (unlocked) total transaction key 34 forces an "ID" machine operation to be next initiated for starting a new sequence in operation. Such "ID" operation in turn forces an "I" operation to follow, after which a selection can be made for next having either an "ADD," a "SUBTRACT," or a "COST" operation. Of course, as was the case prior to the "I" operation, a "TOTAL" operation may likewise be selected for stopping the sequence and causing a new one to be started. Should the "COST" operation be the one that is selected, either of the "ADD" and "SUBTRACT" operations may follow it, or a "TOTAL" operation then initiated for designating the end of the instant sequence and making all mechanisms ready for the next sequence to start. Should an "ADD" operation be selected to follow the "I" operation, or even after the "COST" operation which may have followed, the next permitted machine operation may be any one of the "SUBTRACT," "I," or "COST" operations, as well as the "TOTAL" operation. A similar condition is likewise true should the "SUBTRACT" operation be then selected, which enables a following machine operation to be of either the "ADD," "I," "COST," or "TOTAL" type. The flexibility between the "ADD," "SUBTRACT," "I," and "COST" operations is thus always available for machine operator use, as is the sequence-ending "TOTAL" machine operation. Of course, this flexibility must succeed an earlier "I" machine operation, which in turn must succeed the sequence-starting "ID" machine operation.

*Mounting assembly*

Figure 4:
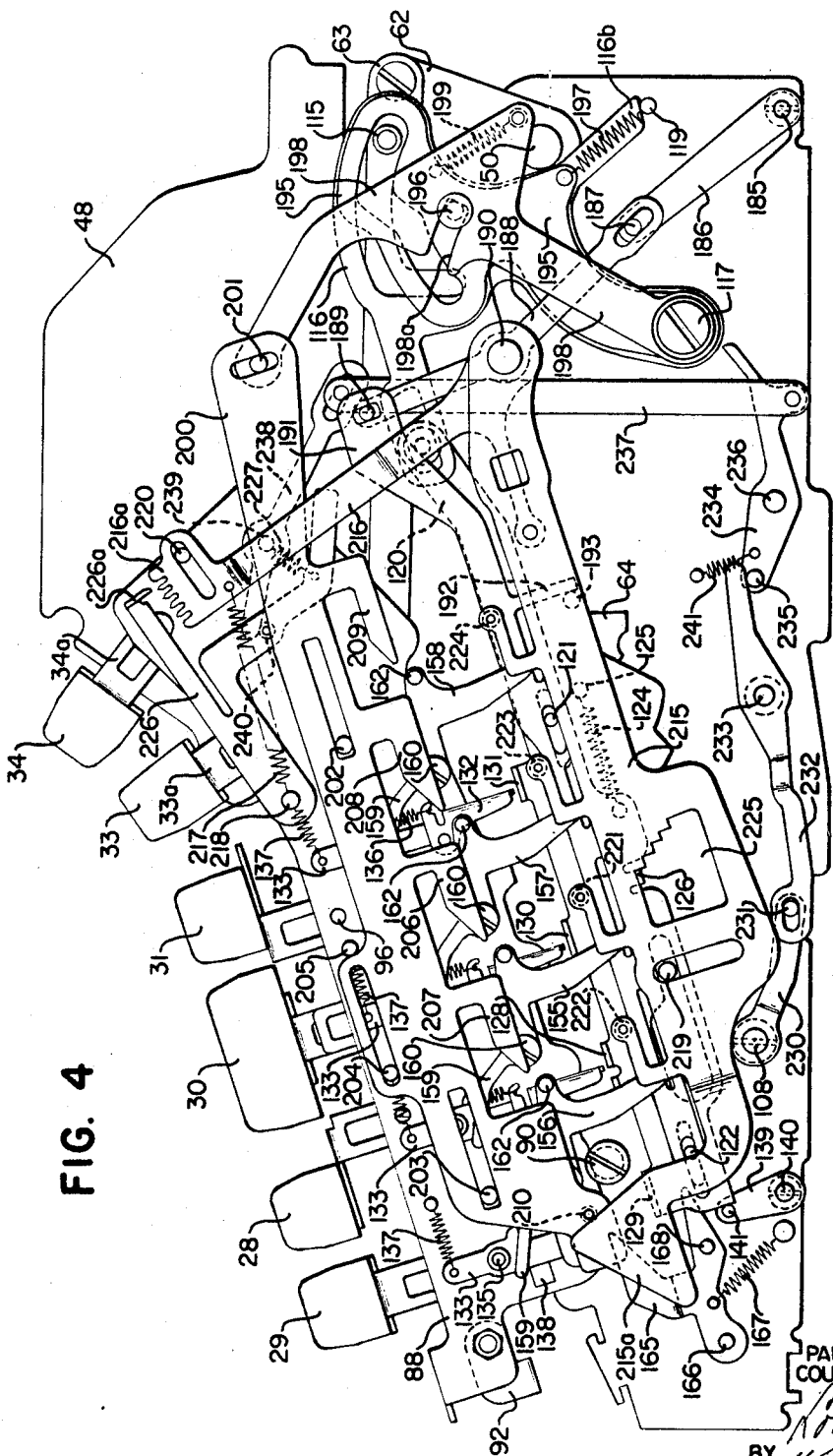
FIG. 4 is a view in elevation of the right side of the machine, with particular reference to the sequence control mechanism thereof, as located on the outside of the right vertical frame plate.

As illustrated in FIG. 4, the major portion of the instant sequence mechanism is located on the outer side of the machine right vertical frame plate 48, being supported in spaced relationship thereto by the following mounting assembly.

Affixed to the outer side of the machine frame plate 48, adjacent the machine keyboard right side plate 71, is a generally-rectangular-in-shape mounting plate 8 (FIGS. 4 and 6). As is clear from FIG. 6, the mounting plate 88 is preferably supported for easy removal from the machine by having an upper aperture 88a thereof engaging over and received behind an upper-rear support screw 89 carried by the machine right vertical frame plate 48, and by having a lower-front edge portion thereof received behind a further support screw 90 also carried by the machine frame plate 48. The precise spacing of the mounting plate 88 outwardly from its supporting machine frame plate 48 is best understood from FIG. 13, where the support screw 90 therefor actually screw-threadedly engages the outer end of a shouldered stud 91 affixed to the machine right vertical frame plate 48. While not included in the illustration of FIG. 13, a similar arrangement is had with respect to the support screw 89, so as to maintain the sequence mechanism mounting plate 88 itself a precise distance from and in parallel alignment with the supporting frame plate 48. Secured to the forwardmost end portion of the mounting plate 88 is an inwardly-directed bracket 92 (FIGS. 4 and 6), the free end portion of which is appropriately shaped to slidinly engage the under surface of an aligned stud 93 carried by the machine keyboard right side plate 71 (see also FIG. 5). This bracket 92 and stud 93 arrangement is a very simple yet effective means for restraining the mounting plate 88 against any unwanted upward movement when once it has been engaged with its support screws 89 and 90, as well as for continually providing rigid alignment of the upper front portion of the mounting plate with respect to the associated machine frame plate 48.

Also included in the sequence mechanism mounting assembly is an auxiliary plate 94 riveted, as at 95, at several zones along the lower edge of the mounting plate 88 (FIG. 4). Like the plate 88, the auxiliary plate 94 is generally rectangular in shape, but on a smaller scale, and actually becomes a lower extension of and is supported solely by the mounting plate 88 (see also FIG. 13). The overall mounting assembly of the plates 88 and 94, as aligned and affixed with respect to the machine right vertical frame plate 48, provides that means necessary for adequately positioning and supporting the following sequence and associated mechanism.

*Transaction key mechanism*

Each of the previously-mentioned control or transaction keys located on the right-hand side of the machine keyboard, being those keys designated 28, 29, 30, 31, 33, and 34 (FIGS. 1 and 2) is, in the usual and well-known manner, slidably mounted with respect to an associated supporting bracket—such as the above-mentioned mounting plate 88 (FIGS. 4 and 7). As is illustrated, a pair of spaced-apart and inwardly-directed stud members 96 and 97 of the plate 88 provides in each instance the necessary means for slidingly guiding and supporting the slotted key stem of each such transaction key (designated as stems 28a, 29a, 30a, 31a, 33a, and 34a, respectively) with respect to the machine right vertical-frame-plate-48-carried mounting plate 88. In each instance, a spring 98 is tensioned between the key stem and the mounting plate so as to yieldingly urge and hold the interconnected transaction key in an upper, non-operated position—all as per the detail showing in FIG. 7. While not being included in the various illustrations hereof, both for the sake of simplicity in disclosure and in view of the earlier incorporation by reference of the Frieberg et al. United States Patents Nos. 2,692,726 and 2,760,722, individual depression of each of the right-hand transaction keys 28, 29, 30, 31, 33, and 34 is effective for actuating associated mechanism for causing an ensuing machine operation to be of either the add, subtract, non-add, sub-total, or total type.

The remaining control or transaction keys 27, 32, and 35, located on the left-hand side of the machine keyboard (FIGS. 1 and 2) are each likewise in the usual and well-known manner mounted for sliding movement with respect to an associated guide and support member. Referring to FIG. 3, the correction key has its stem portion 32a slidably engaged within aligned slots in upper and lower ear portions of an appropriate guide and support bracket 99 affixed to and directed outwardly from the left side plate 70 of the machine keyboard construction. In a similar manner, each of the remaining keys 27 and 35 has its stem portion 27a and 35a, respectively, engaged slidably within aligned slots in upper and lower ear portions of a further guide and support bracket 100 so affixed to the machine keyboard left side plate 70. Respective springs 101 and 102 hold each of the keys 27 and 35 likewise in an "up," or unoperated, position, defined by a lower and forwardly-extending arm portion of the key stem proper coming into contact with the lower ear portion of the guide and support bracket 100. In order to insure non-operation of either of the transaction keys 27 and 35 during the time of a machine cycle operation— that is see that the key cannot be operated unless the machine is at rest—the usual key lock slide 103 is provided for cooperation with the several stems 27a and 35a to lock the keys 27 and 35 at the commencement of a machine cycle, so that they may not be tampered with during the machine cycle, and to actually prevent a machine cycle from commencing if either one of such keys is in an intermediate position between the normal "up" position and fully depressed position, which would cause a misoperation of the machine. The overall actuation of the key lock slide 103 and associated mechanism is shown in more detail in the above-mentioned Frieberg et al. United States reference Patent No. 2,760,722.

In view of the fact that the B transaction key 35 is not itself a motorized or cycle-initiating key, and hence when depressed must be followed by depression of either the sub-total key 33 or the total key 34, it is clear that, when the key 35 is selected and depressed, it must be maintained so operated for that period of time permitting the associated lower, B, totalizer mechanism (FIG. 5) to be the one selected for actuation during the machine operation initiated through either the sub-total key 33 or the total key 34. As illustrated in FIG. 3, depression of the B key 35 causes the lower arm portion of its key stem 35a to move an aligned actuating link 105 downwardly that extent which permits an associated latch arm 112 to move into latching engagement with respect to a key stem lower stud 36. The actuating link 105 includes an upper operating stud 104 immediately below the lower arm portion of the key stem 35a, with the guiding of said link being defined by a central aperture thereof engaging an appropriate side frame stud 106 and its lower end portion being pivotally connected to a rocker arm 107 affixed to the outer end portion of a machine cross shaft 108 (see also FIG. 13). A spring 109, stretched between the rocker arm 107 and an appropriate side frame stud 110, normally urges the machine cross shaft 108 counter-clockwise (FIG. 3), in turn moving the connected actuating link 105 upwardly, where an upper, square stud 111 thereof is positioned effective to maintain the associated latch arm 112 in an ineffective, non-latching, position with respect to the B transaction key 35. As illustrated, the latch arm 112 is rockably mounted on a side frame stud 113 and is yieldingly urged counter-clockwise thereabout by a spring 114 stretched between a lower, forwardly-extending tail portion thereof and the earlier-mentioned side frame stud 110. At the same time, the normal positioning of the actuating link square stud 111 is such that it lies between upper and lower notches 112a and 112b of the latch arm 112, where it is maintained effective prior to transaction key depression for restraining the arm 112 against any counter-clockwise movement. However, as the key 35 is depressed to its operating position, its stem lower arm portion immediately engages the operating stud 104 to move the actuating link 105 that extent downwardly which aligns its square stud 111 with the latch arm lower notch portion 112b. Upon this happening, the interconnected spring 114 is free to rock the latch arm 112 counter-clockwise a distance (as defined by the depth of the notch 112b) sufficient to permit the upper notch 112a thereof to receive the key stem stud 36 therewithin and thereby maintain the depressed B transaction key 35 thereafter in its operated state.

While the restoration of the key 35 may be performed at the time and by any one of many release means, the present embodiment of the invention makes use of a manually-operable key type lock which, when operated, causes the latch arm 112 to be cammed clockwise to free both the transaction key 35 and the actuating link 105 to the normal action of the respective springs 102 and 109. Although not illustrated herein, the key lock itself is carried by the left wall of the machine casing 20, at a zone aligned for convenient camming engagement with an upper rear surface 112c of the latch arm 112. A shoulder 112d of the arm 112 extends below the square stud 111 to effectively restrain the actuating link 105 against downward movement as the key lock is manually operated to its transaction-key-restoring position. This, it is clear, prevents further depression of the B transaction key 35 to an operating position until the key lock itself has been returned to the starting position. Control over the machine lower totalizer is thus available to the desires of the machine owner in that, through his positioning of the key lock provided, the associated latch arm 112 will permit the transaction key 35 to be either depressed for its intended function or positively locked against any depression whatsoever.

*Sequence control mechanism*

Returning now to FIG. 5, it is seen that the link 63, interconnecting for driving movement the machine main shaft 65 with the rear shaft 50, is provided with an outwardly facing roller 115, at a zone in approximate vertical alignment with the machine rear drive shaft 50 when it is in its home, non-oscillated, position. The roller 115 itself extends through an upper cam slot 116a of an associated actuating arm 116 mounted for rocking movement about a supporting screw 117 carried by the machine right vertical frame plate 48 (see also FIGS. 4 and 7). A spring 118, stretched between the actuating arm 116 and a frame-plate-carried stud 119, yieldingly urges the arm 116 clockwise to a home position, where as illustrated by solid lines in FIG. 7, a rear tail 116b thereof comes to rest against an upper surface of the spring stud 119. Movement from home of the actuating arm 116 will, of course, take place during machine operation at the time and for the extent determined by the precise configuration of its cam slot 116a in conjunction with the regular shifting of the roller 115 during the above-mentioned extent (seventy-six degrees) of oscillation of the machine rear shaft 50. To accommodate the needs of the present invention, the cam slot 116a is so fashioned with respect to the regular movement of the associated roller 115 that the actuating arm 116 rocks counter-clockwise during the last twenty-six degrees of the forward (counter-clockwise) oscillation imparted to the machine rear shaft 50 (starting at fifty and ending at seventy-six degrees of movement of the shaft 50) and returning clockwise therefrom (dash-line position of FIG. 7) back to home during the first twenty-six degrees return of the machine rear shaft 50 clockwise back to its starting position. Return of the actuating arm 116 to home will, of course, take place just as soon as movement of the roller 115 permits, through normal urgence of the interconnected spring 118. The overall assemblage, it is clear, provides for the designated counter-clockwise and like return clockwise movements of the actuating arm 116 to take place, respectively, just before and just after mid-cycle of a machine operation is completed.

Interconnected for driving movement by the counter-clockwise rocking of the actuating arm 116 is a sequence control slide 120 mounted for fore-and-aft shifting movement along spaced-apart guide and support studs 121 and 122 of the mounting assembly auxiliary plate 94. As illustrated in FIG. 7, an elongated slot of the control slide 120 engages over each of the studs 121 and 122, while a rearmost stud 123 of the slide 120 extends freely within an upper, forward drive slot 116c of the actuating arm 116. A spring 124, stretched between the control slide 120 and an auxiliary plate stud 125 (see also FIGS. 4 and 6), yieldingly urges the slide 120 rearwardly (to the right in FIG. 7) for positioning each of four upper shoulders 129, 128, 130, and 131 thereof, from front to rear, in a controlling position with respect to permitted depression of the associated control or transaction keys 29, 28, 30, and 31, respectively. With the construction thus far described, it is clear that, through the stud 123 and drive slot 116c arrangement, each counter-clockwise rocking movement of the actuating arm 116 will cause the sequence control slide 120 to move a precise distance forwardly (to the left in FIG. 7) along its guide and support studs 121 and 122 just prior to mid-cycle of machine operation, and, through the interconnected spring 124, each return-to-home rocking movement (clockwise) of the arm 116 will permit the sequence control slide 120 to return automatically rearwardly a precise extent just after mid-cycle of machine operation. The outer limit of forward travel of the sequence control slide 120 is, of course, determined by the movement of the stud 123 under urgence of the rear edge of the drive slot 116c when the actuating arm 116 is rocked its full extent counter-clockwise, all as shown by phantom line illustrations in FIG. 7. Different from this known foremost position, however, is the amount of actual control slide movement performed during each machine cycle of operation for reaching such foremost position, which itself is dependent upon the permitted positioning of the control slide 120 when restored rearwardly by the spring 124 during the preceding machine operation. This, as will be described in detail later in the specification, is through the provision of precise mechanism being actuated various extents during each machine cycle of operation for coordinating the positioning of the sequence control slide 120 to that designated by the last transaction key depressed. In each instance, the positioning of the control slide 120 will enable none, one, or perhaps several of the associated transaction keys 28, 29, 30, and 31 to be next used for initiating a machine operation. Which of such keys might be so used is that, or are those, free to the machine operator for movement to a depressed state, all as permitted from the following control key blocking arrangement.

As mentioned previously, the upper shoulders 128 to 131 inclusive of the sequence control slide 120 determine which of the associated control or transaction keys 28, 29, 30, and 31, if any, may be next depressed for initiating operation of the business machine in question. With this in mind, each of said keys is provided with a depresson-blocking lever 132, which, in accordance with the positioning of the sequence control slide 120, either engages the associated shoulder of the slide 120 for effectively blocking key depression from taking place or freely passes by the associated shoulder of the slide 120 for enabling machine operation to be initiated through the transaction key selected and depressed. As best illustrated in FIG. 7, the blocking lever 132 in each instance is rockably carried by the lower end of a control arm 133, which in turn is rockably carried by the associated key stem in question—there being such arrangement for each of the stems 28a, 29a, 30a, and 31a, as illustrated. While any appropriate mounting means may be provided, the instant disclosure makes use of a rivet 134 pivotally connecting the lever 132 to the arm 133 and an outwardly-extending stud 135 of each key stem rockably supporting said arm 133. A spring 136, stretched between the several members 132 and 133, provides a yielding arrangement therebetween, with the blocking lever 132 urged counter-clockwise to a vertically-aligned position and against a lower edge of the associated control arm 133. This, it is clear, provides an overall assemblage having the lever 132 moved downwardly with the control arm 133 as each transaction key is depressed, but permitting, if need be, the lever 132 to rock thereafter independently of the arm 133. Such latter yielding relationship between the members 132 and 133, as will be better understood from later description hereof directed to precise machine operation, is essential to unrestricted movement of the associated sequence control slide 120 when actuated forwardly (to the left) with the selected transaction key maintained in a depressed condition thereduring. A further spring 137, stretched between the control arm 133 and an appropriate stud of the auxiliary plate 94 (see also FIG. 4), yieldingly urges the arm 133 clockwise and into abutment with an associated limit stud 138, which effectively maintains yieldingly the overall assemblage of members 133 and 132 in operational alignment with the associated shoulder of the sequence control slide 120. This further yielding relationship of the control arm 133 with its supporting transaction key stem is essential, at least with respect to the transaction key 28, to the further unrestricted movement of the associated sequence control slide 120 when returned rearwardly (to the right) with the noted key 28 maintained in a depressed condition. To fit within the overall sequence planned for the instant disclosure, downward movement of the blocking lever 132 is permitted with attempted depression of the key 28 whenever the associated sequence control slide 120 has been caused to be positioned either with its shoulder 128 rearwardly and beyond an inturned sensing edge 132a of the blocking lever 132 or otherwise presented with a slotted zone of its shoulder 128 in substantial alignment with the lever edge 132a. In the latter instance, a dual yielding of the overall blocking lever assemblage is necessary for unrestricted fore-and-aft travel of the control slide 120, requiring the blocking lever 132 thereof to yield clockwise during its forward excursion of movement and requiring the control arm 133 to yield counter-clockwise should its return excursion of movement terminate farther rearwardly than its starting point.

With the overall sequence control mechanism thus far described, it is clear that the positioning of each shoulder of the sequence control slide 120 will either permit or block depression of its associated transaction key for initiating a next machine cycle of operation. By means of sequence control positioning mechanism described in detail later herein, the control slide 120 can return from the terminus of its forward movement to any one of five restored positions—each changing the particular transaction key or keys 28, 29, 30, and 31 which may be next depressed for machine cycle initiation. As illustrated by the solid-line positioning of the slide 120 in FIG. 7, none of the control or transaction keys 28, 29, 30, and 31 is free for depression, as its stem-carried blocking lever 132 will soon abut the control slide shoulder 128, 129, 130, and 131 then located therebelow. Each of said control keys is at this time effectively blocked against depression.

With the sequence control slide 120 permitted to move one position rearwardly, however, of such solid-line showing, where its rearmost stud 123 is restored from its actuating-arm-116-directed "forward moved" position (FIGS. 7 and 8) rearwardly past its "first restored" position to a "second restored" position (FIG. 8), the slotted zone of the control slide shoulder 128 will permit the I transaction key 28 to be freely depressed for initiating a machine cycle of operation thereunder. Each of the remaining transaction keys 29, 30, and 31 will at such time remain blocked against depression in view of the alignment of the associated control slide shoulders 129, 130, and 131 thereunder. Restoration of the sequence control slide 120 to what may be considered a third position, with its stud 123 ending at the "third restored" showing of FIG. 8, has its respective blocking shoulders 128, 129, 130, and 131 so located as to permit both the add transaction key 30 and the subtract transaction key 31 to be free for depression (either one as selected for initiating machine operation) and to have both the I transaction key 28 and the cost transaction key 29 blocked against depression. Further rearward movement of the slide 120 to a fourth position thereof, with its rearmost stud 123 moving rearwardly from its "forward moved" position to the illustrated "fourth restored" position (FIG. 8), places its various shoulders 128 to 131 inclusive in position to prevent depression of the I transaction key 28—its blocking lever 132 abutting the forward surface (left) of the associated shoulder 128, and in position to permit depression of any one of the remaining transaction keys 29, 30, and 31—the key-carried blocking lever 132 in each instance being forward of the associated control slide shoulders 129, 130, and 131, respectively. Still a further shifting rearwardly of the slide 120 to a fifth position, with its stud 123 located at the "fifth restored" position of FIG. 8, permits any one of the control or transaction keys 28, 29, 30, and 31 to be selected and depressed for initiating machine operation. As is clear from an understanding of FIG. 7, each of the shoulders 128, 129, 130, and 131 of the sequence control slide 120 will, at such time, be located rearwardly of its associated depression-blocking lever 132, hence presenting nothing therebelow to hinder any attempted downward movement thereof. As mentioned above, the control over restored positioning of the sequence control slide 120 will be discussed in detail later in the specification.

While the extent of forward movement of the sequence control slide 120 varies in accordance with the previous restored positioning thereof—i.e., depending on when the drive slot 116c of the actuating arm 116 (FIG. 7) first engages the rearmost stud 123 of the slide 120 for moving it forwardly to its "forward moved" position (FIG. 8)— it is clear that the end travel forwardly of the slide 120 will be had at mid-cycle of each machine operation and that it presents the slide front or left-hand edge at that position designated by the phantom-line showing in FIG. 7. Travel rearwardly from such end travel forwardly will, of course, vary, as mentioned above, to any one of the first through fifth restored positions, all through control of the associated positioning mechanism to be described later.

Associated for operation by movement of the sequence control slide 120 is a rocker arm 139 affixed to the right-hand end of a shaft 140 extending between and journalled within the machine right and left vertical frame plates 47 and 48 (FIG. 13). As further illustrated in FIG. 7, the rocker arm 139 is provided with an upper stud 141 in alignment with the forward edge of the control slide 120. The left-hand end of the shaft 140 has, affixed thereto, a control-key-blocking arm 142 in turn, and through an interconnected spring 143, yieldingly urged clockwise so as to present the rocker arm stud 141 in continual abutment with the associated control slide 120. This overall arrangement, as is clear from FIG. 13, transfers the sliding movement and positioning of the sequence control slide 120 as taking place on the outer side of the machine right vertical frame plate 48, into a corresponding rocking movement and positioning to the control-key-blocking arm 142 provided on the outer side of the machine left vertical frame plate 47.

The control-key-blocking arm 142 itself, as further illustrated in FIGS. 3 and 9, is yieldingly connected by means of a spring 144 to an associated control-key-blocking pawl 145 supported for rocking movement on an outwardly extending frame plate stud 146. As seen from the left side of the machine (FIG. 3), the spring 144 urges the pawl 145 clockwise (counter-clockwise as seen in FIG. 9) and into abutment with a control stud 147 of the blocking arm 142. Each rocking movement of the arm 142 under control of shifting of the slide 120 thus causes the pawl 145 to rock first counter-clockwise (FIG. 3) that distance defined by the sequence control slide 120 moving from its last restored position to its forwardmost extent of travel— all through the clockwise rocking of the associated blocking arm 142 thereby—and thence, under control of the spring 143, to be restored clockwise that extent permitted by the slide 120 returning rearwardly to the selected one of its permissible five restored positions. Travel of the blocking pawl 145 clockwise is thus the greatest during a machine operation having the sequence control slide 120 return to its rearmost, "fifth restored," position, at which time an upper extension 142a of the blocking arm 142 falls just short of engagement with the blocking pawl support stud 146. On the other hand, with the slide 120 returning only to its "first restored" position, it is clear that the blocking pawl 145 will return clockwise only to its starting position, as illustrated in FIG. 3. The intervening "second, third, and fourth restored" positions of the sequence control slide 120 will, of course, permit further increments of clockwise movement of the blocking pawl 145.

Mounted for sliding movement on the stud 146 is an actuating link 148, having, as illustrated in both FIGS. 3 and 9, an upper operating stud 149 aligned immediately below the stem 27a of the previously-described ID transaction key 27, and having its lower end pivotally connected to a guide link 150 rockably carried by the earlier-mentioned side frame stud 113. As illustrated in FIG. 3, the actuating link 148 is located on the outer side of the blocking pawl 145 and is provided with an elongated slot for receiving its supporting stud 146 therethrough. The lower end of the link 148 rests against a left arm 151a of a bail 151 rockably mounted on the previously-described machine cross shaft 108. As further illustrated in FIG. 13, the positioning of the bail 151 is within the machine frame plates 47 and 48, with a turned-over ear 151c of its left arm 151a extending outwardly and through an aperture provided therefor in the machine left vertical frame plate 47. This, it is clear, permits the ear 151c to be positioned immediately below the actuating link 148 on the outer side of the left frame plate 47. A spring 152, stretched between the left arm 151a and the left frame plate 47 (FIG. 9), yieldingly urges the bail 151 (i.e., its turned-over ear 151c) into abutment with the actuating link 148 (clockwise as viewed from the right in FIGS. 5 and 9, and counter-clockwise as viewed from the left in FIG. 3). Depression of the ID transaction key 27, through the intervening actuating link 148, thus causes the bail 151 to be rocked against the normal urgence of its spring 152. However, should the bail 151 be restrained against any such movement at the time of selection of the key 27, the result would be a blocking against depression of such key. The overall control over the bail 151 is thus effective for providing a means whereby the ID transaction key 27 is either permitted or estopped in actuation for initiating a desired machine operation therethrough.

As illustrated in FIG. 3, the blocking pawl 145 is provided with a shoulder 145a operably aligned for travel under the bail ear 151c whenever, under control of the permitted counter-clockwise rocking of the associated blocking arm 142, the previously-discussed sequence control slide 120 (FIG. 7) is restored to a position rearwardly of that designated "first restored"; that is, returns from its "forward moved" position rearwardly and beyond its illustrated "first restored" position to either its "second, third, fourth, or fifth restored" position. With the machine in a "sequence-starting" condition—i.e., with the control slide 120 at its "first restored" position (FIG. 7)—the blocking pawl 145 is caused to be maintained in a non-blocking position with respect to the associated bail 151, in turn permitting the ID transaction key 27 to be selected and depressed for initiating a machine cycle of operation at this time. However, with the sequence control slide 120 moving rearwardly and beyond such illustrated positioning of FIG. 7, rocking of the shaft 140 in following it presents the blocking pawl 145 in a position where its shoulder 145a comes to rest below the bail ear 151c to prevent the initiation of a second or further machine cycle of operation through the ID transaction key 27. As is clear from previous description relating to the precise movement of the sequence control slide 120, the control-key-blocking pawl 145 first rocks a precise extent counter-clockwise (FIG. 3) as the slide 120 is shifted to its forwardmost position, and thence returns clockwise an extent corresponding to the restored position selected for ending rearward travel of the slide 120—remaining free and clear of blocking engagement with respect to the associated ID transaction key 27 up to and through the control slide 120 restoring to its "first restored" position and being presented in a blocking position with respect to the key 27 at any time thereafter.

In the manner set out in detail in the above-mentioned United States reference Patent No. 2,760,722, a single machine operation only can be initiated by each depression of the key 27, with a next machine operation taking place therethrough only after said key is first restored to an undepressed state. This ordinarily permits the associated transaction key blocking pawl 145 to reach its blocking position upon completion of the first machine operation intiated through the associated transaction key 27. However, to insure that one and only one such key-27-initiated machine operation is permitted within the overall sequence designated, and to actually provide a safety factor against a machine operator's effecting only a partial restoration of the key 27 and then attempting to again depress the key for further machine operation therethrough, the blocking pawl 145 is provided with a second or auxiliary shoulder 145b below the shoulder 145a adapted for receipt below the bail ear 151c just as soon as the ID transaction key 27 is permitted to restore even a slight distance upwardly. In this manner, the blocking pawl 145, via the auxiliary shoulder 145b, is likewise effective for the further purpose intended prior to the time that the ID transaction key 27 can be depressed a second time for machine operation.

*Selector lever mechanism*

Associated for operation with each of the right-hand transaction keys 28, 29, 30, and 31 is a sequence selector lever—being designated (FIG. 4) as levers 155, 156, 157, and 158, respectively. The overall configuration of each said lever (as per lever 155 shown in FIG. 10) is such that, through an upper arm portion 159 thereof being aligned immediately below the key-stem-carried stud 135, it will be rocked counter-clockwise about a central supporting screw 160 each time the associated transaction key is selected and depressed to its machine-cycle-initiating position, as representatively illustrated by the phantom-line showing in FIG. 10, this rocking of the sequence selector lever, which is against the normal urgency of an interconnected spring 163, presents, for the precise reasons soon to be explained, a lower tail portion 161 and rear stud 162 thereof a precise extent upwardly from that positioning thereof gained through normal urgence of said spring 163.

In a like manner, associated for operation with the left-hand transaction key 27 is a further sequence selector lever—but of entirely different operational arrangement and configuration from that described above for the levers 155 to 158 inclusive. As illustrated in FIG. 4, such further lever, designated as 165, is likewise provided on the machine right side, being mounted for rocking movement about a supporting stud 166 extending outwardly from the lower, front portion of the machine right vertical frame plate 48. A general Y-shape best defines the overall configuration of the lever 165, rocked clockwise under urgence of an interconnected spring 167 until its right-hand branch comes into contact with a lower stop stud 171 of a non-add control lever 170 rockably mounted on a further frame plate stud 173 (see also FIG. 5). Interconnected for actuating the control lever 170 is a bell crank 172, in turn interconnected by a stud 174 to the forward end of a link 175 supported adjacent its other end by the usual non-add and total lock lever latch 176.

Returning now to FIG. 3, it is recalled that depression of the ID transaction key 27, through downward shifting of the actuating link 148, imparts a clockwise rocking movement to the associated bail member 151. As this is done, a right arm portion 151b thereof (FIG. 5), in engaging an associated stud 177, imparts a forward shifting movemnet to the link 175—in turn, through the interconnected control lever 170, overcoming the spring 167 and rocking the sequence selector lever 165 a precise distance counter-clockwise (that is, from its solid-line showing to its dotted-line showing in FIG. 5). This presents, for the reason soon to be explained, an upper camming edge 165a of the lever 165 upwardly from its normal, spring-167-urged, positioning.

*Sequence interlock mechanism*

As is clear from the illustrations and description thus far presented, without more being presented, each sequence selector lever caused to be rocked through depression of its associated transaction key will be released for spring restoration immediately upon the selected key itself being released by the machine operator. In the one instance, as is clear from FIG. 10, those such levers associated with the right-hand transaction keys will each restore under urgence of the spring 163 just as soon as the depressed key itself moves upwardly under urgence of its interconnected spring 98 (FIG. 7). In like manner, as is clear from FIGS. 3 and 5, the lever 165 associated with the left-hand transaction key will restore under urgence of the spring 167 just as soon as the key itself (27) is restored by the spring 101 upwardly and to its non-depressed position.

To insure that each sequence-permitted machine operation, when once selected, actually takes place and is completed even though the initiating or other type-of-operation (transaction) key is not maintained depressed for any appreciable length of time (that is, released before or right after machine cycling commences), which in turn insures the stage in sequence to be advanced from that last permitted to the next permitted, appropriate interlock mechanism of the following type is employed to maintain each of the sequence selector levers for a precise period of time in that rocked position earlier gained upon depression of its associated transaction key. As illustrated in FIG. 5, the latch 176, connected to the link 175, has a forwardly-projecting nose 176a normally blocking counter-clockwise movement of the usual non-add and total lock lever 178 associated therewith, which lock lever itself is pivoted on a shouldered stud 179 and is urged by an interconnected spring 180 to present a lower foot portion 178a thereof in contact with the said latch nose 176a. With this overall construction, it is clear that, as the link 175 moves forward, as described above, upon depression of the ID transaction key 27, in turn causing the sequence selector lever 165 to rock its distance counter-clockwise, the interconnected latch 176 rocks clockwise to displace its nose 176a upwardly until the foot 178a of the lever 178 moves under the nose 176a, allowing the lock lever 178 to rock counter-clockwise for preventing rearward movement of the link 175 until a precise time period during the machine cycle of operation initiated through the depressed transaction ID key 27. That is, when once the link 175 is moved forwardly during initial depression of the transaction key 27, restoration rearwardly thereof under urgence of the usual spring connected thereto, such as the spring 181 illustrated in FIG. 5, is prevented until that period of time during machine operation that the non-add and total lock lever 178 removes its lower foot portion 178a from blocking any counter-clockwise return movement of the associated latch 176. Such a release of the latch 176 takes place during the last half-cycle of a machine operation as the lock lever 178 is thence restored to its home position. As illustrated, the lock lever 178 has a by-pass pawl 182, which is by-passed by a stud 66 on the full stroke sector 64 during the first half-cycle of a machine operation, but which, during the last half-cycle thereof, is engaged by return of the stud 66 for thence rocking the lever 178 clockwise and back to its home position. The latch 176 may, of course, then return counter-clockwise under action of the spring 181, so as to present its nose 176a in position for holding the lock lever 178 at home. Through this arrangement, it is clear, the initial rocking of the sequence selector lever 165 from its normal (solid-line) position to its upper (broken-line) position is maintained throughout the first half of a machine cycle of operation even though the initiating key 27 is caused to be released by the machine operator at any time prior thereto. This, as will be better understood from later description, insures that sequence advancement during machine operation initiated through the ID transaction key 27 takes place even though said key is immediately released for automatic restoration upon once reaching full depression.

Figure 10:
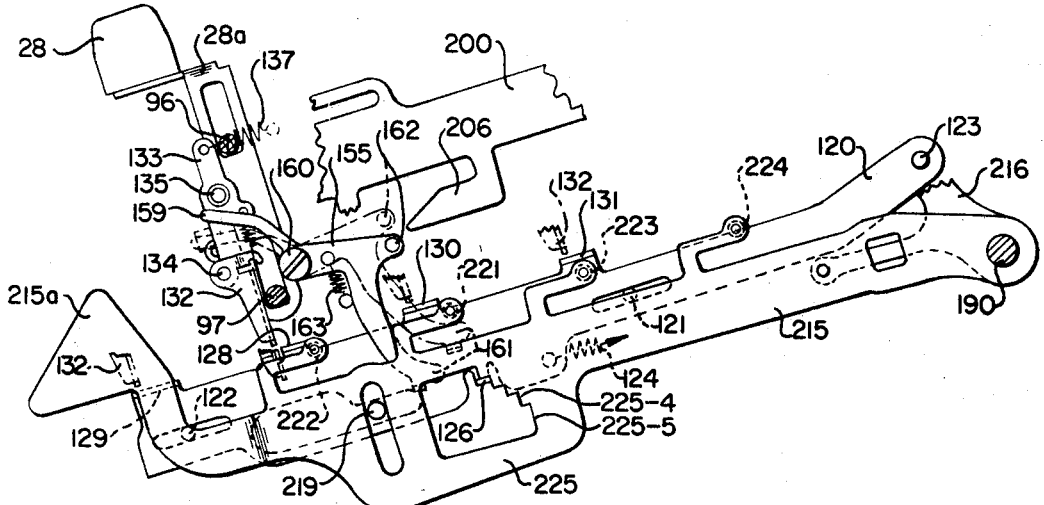
FIG. 10 is a fragmentary detail view, as seen from the right, of the various portions of the instant invention as associated with a typical one of the machine-carried right-hand transaction keys—all as positioned prior to key depression and machine operation.
Figure 11:
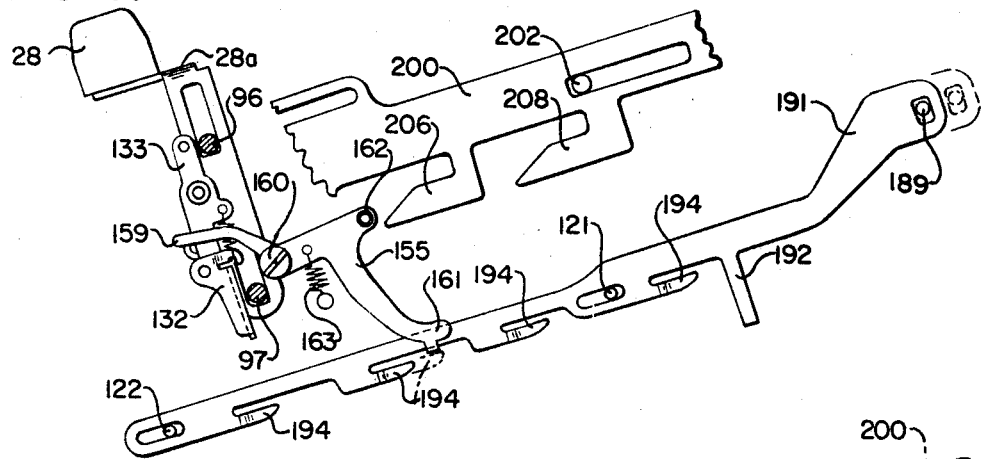
FIG. 11 is a detail view, as seen from the right, of a further portion of the instant invention as associated with the transaction key of FIG. 10—all as positioned after key depression but prior to machine operation.

Looking now to FIGS. 6 and 13, and recalling earlier description relating to machine tripping, it is clear that, as the multiple-armed lever 42 is rocked clockwise under force of its associated spring for actuating the machine trip switch via its lower stud 43 (see also FIG. 5), movement of a further stud 183 thereof at this time is effective for imparting a slight counter-clockwise rocking movement to a lower rear shaft 185 extending between and journalled within the machine left and right vertical frame plates 47 and 48—being so done by an intervening yoke arm 184 pinned to the shaft 185 and slidingly engaging the lever stud 183. Secured to the right-hand end of the shaft 185, so as to be positioned at a zone in substantial alignment with the interconnected mouning and auxiliary plates 88 and 94 (FIG. 13) is a trip interlock arm 186 having an upper stud 187 operably interconnecting the lower end of an actuating lever 188. As best illustrated in FIG. 6, the actuating lever 188 is rockably mounted on a side frame stud 190 and has an upper stud 189 operably engaging the rear end of a trip interlock slide 191 mounted for fore-and-aft movement along the auxilitary-plate-94-carried guide and support studs 121 and 122. Normal positioning of the slide 191 is forward, as illustrated in FIG. 6, where a lower extension 192 thereof comes to rest against a control stud 193 provided on the auxiliary plate 94. Counter-clockwise rocking of the shaft 185, as described above, through machine tripping via the multiple-armed lever 42, in turn actuates the interconnected lever 188 that extent to move the trip interlock slide 191 a precise distance rearwardly to the phantom-line illustration of FIG. 6. This movement of the trip interlock slide 191, as further illustrated in FIG. 11, is sufficient to retain any one of the sequence selector levers 155, 156, 157, and 158 in its counter-clockwise rocked position, as described previously, until a precise portion of the machine cycle of operation then initiated has been completed. That is, when once any one of the right-hand transaction keys 28, 29, 30, and 31 is depressed for initiating a machine cycle of operation, the associated sequence selector lever caused to be rocked thereby for presenting its lower tail 161 and rear stud 162 upwardly from normal will in each instance be so maintained for a precise period of machine cycling time even though the associated transaction key itself is released from depression at some time prior thereto. As is clear from FIG. 11, this is accomplished through a plurality of feet 194 provided along the lower edge of the trip interlock slide 191, one so spaced from the other as to be available for engaging under an inturned extension of the lower tail 161 of each of the sequence selector levers 155 to 158 inclusive. As shown with respect to the representative transaction key 28 included in FIG. 11, rearward movement of the slide 191 has presented the associated one of its feet 194 immediately below the inturned extension of the lower tail 161 of the sequence selector lever 155, the latter having been previously rocked counter-clockwise under control of the transaction key 28, all as described previously with respect to FIG. 10. The timing of movement of the trip interlock slide 191, is, of course, immediately had upon full depression of one of the transaction keys, such, for example, as the illustrated key 28, and the slide 191 remains so actuated rearwardly until the above-described restoration of the multiple-armed lever 42 takes place near the end of the machine cycle of operation initiated through the transaction key depressed. It is thus clear that, through regular operation of this particular slide 191, any sequence selector lever 155, 156, 157, and 158 caused to be rocked counter-clockwise, as described above, will be effectively maintained so rocked until the machine cycle of operation thence called into existence has been nearly completed. This, in the precise manner soon to be described, insures that the sequence will be advanced to its next permitted stage, even though the particular transaction key selected and depressed at the instant stage is permitted to restore immediately after full depression thereof is first reached.

*Selector lever positioning mechanism*

Also mounted for rocking movement about the right vertical frame plate screw 117 (FIGS. 4 and 6) is a slide-actuating arm 195, positioned immediately outside of the arm 116 thereon and also having an upper cam slot 195a receiving the link-63-carried roller 115 therethrough. Yieldingly interconnected for movement with the slide-actuating arm 195 is an auxiliary arm 198, having a central slot 198a slidingly engaging a shouldered stud 196 of the arm 195, and being itself likewise mounted for rocking movement about the supporting screw 117. A spring 199, stretched between the arms 195 and 198, yieldingly maintains an interconnection therebetween defined by the arm-195-carried stud 196 seated against the innermost end of the slot 198a in the arm 198. A spring 197, stretched between the slide-actuating arm 195 and the side frame stud 119, which stud 119 likewise supports the spring 118 associated with the earlier-mentioned actuating arm 116 (FIGS. 6 and 7), yieldingly urges the yieldingly-interconnected arms 195 and 198 clockwise to a home position, as illustrated in FIG. 6. Movement from home of the slide-actuating arm 195, and hence of its interconnected auxiliary arm 198, will, of course, take place during machine operation at the time and for the extent determined by the precise shape of its upper cam slot 195a in conjunction with the regular shifting of the roller 115 during oscillation of the machine rear shaft 50. As defined by the illustration of FIG. 6, the cam slot 195a is of that configuration with respect to the associated roller 115 to impart a counter-clockwise rocking movement of approximately forty degrees to the slide-actuating arm 195, and hence likewise to the interconnected auxiliary arm 198, during the above-mentioned extent (seventy-six degrees) of forward oscillation of the machine rear shaft 50—commencing at twenty degrees and ending at sixty degrees points in time thereof. Return to home of the arms 195 and 198, clockwise from the dash-line position back to the solid-line position of FIG. 6, will, of course, take place through normal urgence of the interconnected spring 197 just as soon as movement of the roller 115 permits during return oscillation of the rear shaft 50.

Interconnected for driving movement by the rocking of the slide-actuating arm 195 is a selector lever positioning slide 200, mounted for fore-and-aft shifting movement along spaced-apart guide and support studs 202, 203, and 204 of the mounting plate 88 (FIGS. 4 and 6). As illustrated, an elongated slot of the selector lever positioning slide 200 engages over each of the studs 202, 203, and 204, while a rearmost slot thereof, normal to said elongated slots, receives slidingly therein an upper drive stud 201 of the auxiliary arm 198. The earlier-mentioned spring 197 for the actuating arm 195 yieldingly urges the slide 200 rearwardly to a home position defined by an upper shoulder thereof coming into engagement with a further stud 205 on the mounting plate 88 (solid-line showing in FIG. 6). It is thus clear that, with this overall construction, each counter-clockwise rocking movement of the slide-actuating arm 195, in turn carrying the auxiliary arm 198 therewith, will cause the selector lever positioning slide 200 to move a precise distance forwardly from its normal, home position (from the solid-line showing to the phantom-line showing in FIG. 6) along the guide and support studs 202, 203, and 204 during the middle half (forty degrees) of the overall forward oscillating movement (seventy-six degrees) of the machine rear shaft 50, and, through the arm-restoring spring 197, each return-to-home movement of the arm 195 will cause the slide 200 to then be returned rearwardly for engagement with the mounting plate stud 205 during the like middle half of the return oscillating movement of the rear shaft 50.

Figure 12:
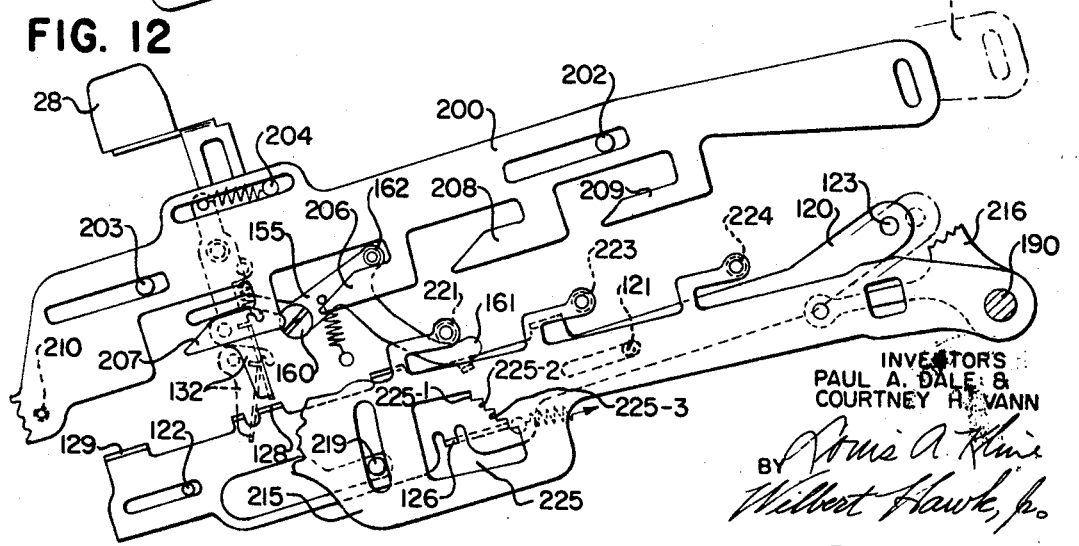
FIG. 12 is a showing, as seen from the right, of the invention portions illustrated in FIG. 10, but as caused to be actuated during machine operation.

As illustrated in FIG. 6, the selector lever positioning slide 200 is so formed as to be provided with four lower camming feet, designated 207, 206, 208, and 209, from front to rear, and also provided with a lower front stud 210; such feet and stud being, as further illustrated in FIG. 4, normally positioned slightly behind the associated sequence selector levers 156, 155, 157, 158, and 165, respectively. In each instance, the camming foot provided has its forward edge inclined upwardly and rearwardly, so as to be, during each shifting forwardly of the slide 200, available for engaging the rear stud 162 and rocking farther counter-clockwise any one of the sequence selector levers 155, 156, 157, and 158 caused to be earlier rocked and maintained a distance from home through depression of its associated transaction key. This is best understood from FIGS. 10, 11, and 12, where the representative selector lever 155 has been earlier rocked during depression of the associated transaction key 28 (FIG. 10) and has been maintained in such rocked condition through regular actuation of the trip interlock slide 191— so as to then present its upper rear stud 162 in operable alignment with the forward inclined edge of the associated camming foot 206 carried by the selector lever positioning slide 200 (FIG. 11), and having the forward shifting movement of the slide 200 thereafter effective for rocking the selector lever 155 still farther until its upper rear stud 162 gains a position and actually rides on the upper surface of the camming foot 206 itself (FIG. 12). This, of course, raises the lower tail 161 of such further-rocked sequence selector lever farther upwardly and to a final position defined by the overall height of the camming foot in question—that is, by the distance the forward inclined edge of said camming foot must raise the lever stud 162 until it reaches the upper surface thereof. As best understood from FIG. 6, for the purpose of the present disclosure the rearmost camming foot 209 is clearly of a lesser height than the remaining camming feet 206, 207, and 208, and, although not immediately apparent from visual inspection alone, the forwardmost camming foot 207 is slightly less in height than the intermediate feet 206 and 208. With this in mind, it is thus understood that, while each of the camming feet will, during forward movement of the slide 200, effectively raise the associated sequence selector lever if initially rocked earlier under depression of its associated transaction key, the extent of such raising of the COST-key-29-controlled lever 156 will, under operation of the camming foot 207, be something less than that, under operation of the camming feet 206 and 208, of either of the additional I key 28 and ADD key 30 controlled levers 156 and 157, respectively, whereas the extent of such raising of the subtract key 31 controlled lever 158 will, under operation of the camming foot 209, itself be still something less than that of the COST-key-29-controlled lever 156. These extents of raising of the various sequence selector levers, of course, can be made to any desired order, depending upon the overall height of the particular camming foot employed therewith (FIG. 18). Recalling earlier description, one and only one of such sequence selector levers 155 to 158 will be pre-rocked for camming foot actuation during any one machine cycle of operation.

Referring now to FIGS. 4 and 5, it is seen that, as each of the camming feet is effective for performing its particular selector lever raising function during forward movement of the selector lever positioning slide 200, the lower front stud 210 of the slide 200 will engage the upper camming edge 165a for additional rocking counter-clockwise of the sequence selector lever 165 whenever it has been previously moved from home through depression of the associated ID transaction key 27 (FIG. 3). The extent of additional movement of the lever 165 is best illustrated in FIG. 15, where forward movement of the stud 210 in engaging the camming edge 165a raises the lever 165 from its first raised and maintained position prior to machine cycling (see also FIG. 5) to a new raised position an appreciable extent counter-clockwise therefrom. This further movement of the lever 165 can also only happen singularly—that is, not in addition to the raising of any of the remaining levers 155 to 158. Return of the lever 165 to home will, of course, take place upon restoration of the selector lever positioning slide 200 rearwardly during the mid-forty degrees period of time of the machine last half-cycle of operation. This, of course, holds true likewise for any one of the remaining levers 155 to 158 caused to be operated by forward movement of the slide 200.

With the overall construction thus far presented, it is seen that, when the sequence-permitting transaction key is selected and depressed by a machine operator, such key depression, in addition to initiating a precise type of machine operation, will rock a precise extent an associated one of the particular sequence selector levers provided. In addition to this, said transaction key likewise actuates mechanism for maintaining such lever as initially rocked until that time during machine cycling such lever is caused to be further rocked in accordance with either the associated camming foot or stud associated therewith when regularly actuated first forwardly and then rearwardly during the machine cycle of operation so initiated through the particular transaction key first depressed. The yieldable interconnection between the slide-actuating arm 195 and the auxiliary arm 198 is provided for the usual and well-known reason of breaking the driving arrangement therebetween should the selector lever positioning slide 200 become overloaded or actually stopped during its forward excursion of movement—the interconnected auxiliary arm 198, in view of the permitted tensioning of the spring 199, being then free to yield to any slide interference while the associated actuating arm 195 completes its full extent of counter-clockwise rocking movement during machine cycling.

*Sequence control positioning mechanism*

Rockably mounted on the earlier-mentioned side frame stud 190, on the outer side of the lever 188 supported thereby (FIGS. 4 and 6), is a sequence selector sector 215 yieldingly urged counter-clockwise by a spring 217 stretched between an upwardly-directed sequence holding arm portion 216 thereof and an appropriate stud 218 of the mounting plate 88. As best illustrated in FIG. 4, the sector 215 extends forwardly from its support stud 190 and is provided both with an upper extension portion in the area of operation of each of the previous sequence selector levers 155, 156, 157, and 158, and with a forward nose portion (triangular, and designated 215a) in the area of operation of the earlier-mentioned sequence selector lever 165. Effective guidance for the sequence selector sector 215 during rocking thereof is had through the usual stud-and-slot arrangement, as per the frame-plate-48-carried stud 219 and mounting-plate-88-carried stud 220 engaging the several sector per se and holding arm portion slots provided (FIG. 4). With this overall arrangement, it is seen that the sequence selector sector 215 is available for rocking movement about its supporting stud 190, either counter-clockwise under normal urgence of the spring 217 or, as now to be explained with respect to the various sequence selector levers, against the urgence of the spring 217 during the regular forward shifting of the just-described selector lever positioning slide 200.

As is clear from FIG. 4, each of the upper extensions of the sequence selector sector 215 is provided with an inwardly-directed stud operably aligned with an associated one of the selector levers 155, 156, 157, and 158, being specifically the studs 221, 222, 223, and 224, respectively. In each instance, as representatively illustrated in FIG. 10, the stud lies in the path of upward travel of the lower tail 161 of its associated lever and will be, as illustrated in FIG. 12, effectively raised thereby as the selector lever itself, under control of the associated camming foot, is further rocked counter-clockwise to that extent described above, where its rear stud 162 comes to rest on the upper surface of said camming foot during the regular forward movement of the selector lever positioning slide 200 during machine operation. The particular one of the studs 221 to 224 so picked up by its associated selector lever, of course, depends upon which one, if any, of the transaction keys 28 to 31 has been depressed for initiating the machine operation in question. This, of course, pre-positions the associated sequence selector lever so as to present and maintain its upper rear stud 162 in alignment with the forward, inclined edge of the particular positioning slide 200 camming foot associated therewith (FIGS. 10 and 11). The extent of upward movement of the stud so engaged, and hence extent of clockwise movement thereby imparted to the sequence selector sector 215 itself (FIG. 12), of course, depends upon the overall height of the associated camming foot.

Now considering FIG. 15, clockwise rocking of the sequence selector sector 215 is likewise had through the additional counter-clockwise rocking of the sequence selector lever 165 whenever, as described previously, the ID transaction key 27 is the one which has been depressed for initiating machine operation. In this instance, it is recalled, forward shifting of the selector lever positioning slide 200, through its lower front stud 210, rocks the lever 165 an additional amount counter-clockwise from the earlier pre-positioning for a limited extent upon depression of the transaction key. As this additional rocking takes place, a lower stud 168 of the lever 165 engages the under surface of the forward nose depression 215a and moves it upwardly for rocking the sector 215 a precise distance clockwise.

Recalling now the earlier description of the sequence control mechanism, it is remembered (FIG. 7) that the sequence control slide 120 is, in regular manner, shifted during each machine cycle of operation to what is considered a "forward moved" position and thence is permitted to return rearwardly to any one of five restored positions (FIG. 8), which determines which one or ones of the transaction keys may be next depressed for machine cycle initiation. Adding now to this sequence control positioning mechanism being now described, it is seen that, in addition to the various shoulders 128 to 131 associated with the right-hand transaction keys 28, 29, 30, and 31, all for the purposes described previously, the sequence control slide 120 is provided with a lower, outwardly-extending finger 126 received within a stepped opening provided through a central zone of the sequence selector sector 215. The sector opening itself, hereafter referred to as the opening 225 (FIG. 14), has its rear edge stepped downwardly and rearwardly, so as to provide, one after the other, spaced step surfaces 225–1, 225–2, 225–3, 225–4, and 225–5 for engagement by the finger 126 during each rearward return movement of the sequence control slide 120. That is, as illustrated and referred to in FIG. 14, the configuration of the opening 225 is such that rearward return movement of the sequence control slide 120 will be stopped at any one of five positions, depending upon which one of the step surfaces 225–1 through 225–5 is presented in alignment with the lower finger 126 thereof during the timing of restoration of the slide 120. The slide 120 is in the previously-mentioned "first restored" position (FIG. 8) whenever rocking of the sequence selector sector 215 presents the surface 225–1 immediately behind the slide finger 126, while the "second, third, fourth, and fifth restored" positions will be had whenever rocking of the sector 215 presents in alignment with the slide finger 126 the remaining surfaces 225–2, 225–3, 225–4, and 225–5, respectively.

The precise operation of the interrelated sequence control slide 120 and sequence selector sector 215 is best understood from a viewing of the various operational showings in FIGS. 10 through 15, along with the FIG. 4 showing of the overall sequence mechanism hereof as positioned when at home or what might be considered sequence starting position. As is clear from FIG. 4, the sequence starting position—that is, with the ID transaction key 27 only free for depression—will be dictated by the sequence control slide 120 whenever nothing prevents the spring 217 from rocking the sequence selector sector 215 its full extent counter-clockwise, where the upper surface of its opening 225 is abutted against the control slide lower finger 126. This, it is clear, will have the step surface 225–1 (see also FIG. 14) presented in alignment with the finger 126 for stopping return movement rearwardly of the control slide 120 when it reaches its earlier-mentioned "first restored" position. The timings of shifting and possible rocking of the several members 120 and 215 are, of course, extremely important, in that the slide finger 126 must move forwardly and from engagement with one step surface of the sector opening 225, as illustrated in FIG. 15, and thence be returned rearwardly for engagement with a new and different step surface of said opening only after the selector lever positioning slide 200 has had time to be actuated for repositioning the sector 215 to the next slide 120 stopping position; that is, with the newly-selected step surface of the opening 225 thereof presented in the path of regular return travel of the slide-carried finger 126. In accordance with the precise timings of operation herein set forth, forward movement of the slide finger 126 takes place approximately simultaneously with the selector-lever-controlled rocking of the sector 215, with return movement rearwardly of the finger 126 being completed prior to the time that the sector 215 is released from control of its rocking lever and thus given over to the action of the spring 217. This is to say that the order of operation has the sequence control slide 120 being moved forwardly, the sequence selector sector 215 being thence rocked to its transaction-key-controlled position, and the slide 120 thereafter being returned rearwardly for gaining that "restored position" defined by the particular step stopping surface 225–1 through 225–5 thence presented in alignment with its lower finger 126— after which the sector 215 is released to the action of the spring 217 for finalization in positioning of the slide finger 126 with respect to that sequence controlling step of the sector opening 225 presently selected. Essentially, the spring 217 at this time will rock the sector 215 that limited amount for presenting the slide finger 126 within the corner (interconnection of step upper surface with step rear stopping surface) of the sequence controlling step so selected. Through this overall mode of operation between the several members 120 and 215—namely, the relationship between the lower finger 126 and the control steps 225–1 through 225–5 thereof—each rearward positioning of the slide 120 will be to a particular one of the above-mentioned "first through fifth restored" positions for permitting a certain one or ones of the transaction keys to be then free for machine cycling and sequence advancement; all in accordance with which one, if any, of the sequence selector levers 155 to 158 and 165 has been pre-positioned by the transaction key last depressed for controlling the extent of movement of the associated sequence selector sector 215.

With the overall mechanism in its home, or sequence-starting, position (as per the illustrations of FIGS. 4 and 7), it is remembered that the ID transaction key 27 alone is available for initiating a machine operation of the digit-entering type. At this time, the blocking pawl 145 associated with the transaction key 27 is in its ineffective position (FIG. 3), whereas the step-225–1-defined stopping of the sequence control slide 120 at its "first restored" position (FIG. 7) is effective to present each of the upper shoulders 128 to 131 thereof in its blocking position with respect to the associated right-hand transaction keys 28, 29, 30, and 31. As is clear from the mechanism thus far discussed, the gaining of such sequence-starting position of the slide 120 would be had whenever a machine operation is called into existence through a transaction key not pre-positioning an associated sequence selector lever for later actuation by the selector lever positioning slide 200; hence leaving the sequence selector sector 215 free for full rocking movement counter-clockwise under urgence of its spring 217 when once the lower finger 126 of the sequence control slide 120 moves forwardly and away from that sequence-controlling step of the sector opening 225 last engaged with (see FIGS. 12 and 15). As the the sector 215 will not at this time be under control of any one of the slide-200-carried camming feet 206 to 209, it is clear that nothing will prevent its being rocked until the upper edge of its opening 225 abuts against the lower finger 126 of the control slide 120 while reaching its "forward moved" position, thus enabling the return restoring of the slide 120 to be dictated by the thence aligned first step stopping surface 225–1. While such a machine operation is, of course, available under either of the sub-total or total transaction keys 33 and 34 (FIGS. 1 and 2), in that neither has any sequence selector lever whatsoever associated therewith, it is remembered that the operational requirements of the instant embodiment of the invention specify non-advancement of the sequence during machine operations of either the sub-total or B-total type. Thus, mechanism is provided and will soon be described for holding the sequence to that stage last attained during any machine cycle initiated through depression of either the sub-total transaction key 31 or the B transaction key 35 in conjunction therewith or with the total transaction key 34.

Depression of the ID transaction key 27, it is remembered, pre-conditions the associated sequence selector lever 165 so that it has its upper camming edge 165a (FIG. 5) presented in alignment with the lower front stud 210 of the selector lever positioning slide 200, in turn being picked up and rocked that extent counter-clockwise during forward movement of the slide 200 for, through engagement of its lower stud 168 with the forward nose portion 215a, rocking the sequence selector sector 215 that extent clockwise which presents the step stopping surface 225–2 in alignment with the finger 126 by the time for return of the sequence control slide 120 during machine cycling. This overall operation is best illustrated in FIG. 15, where, through the counter-clockwise rocking of the sequence selector lever 165 during forward shifting of the associated lever-positioning slide 200, the sector 215 is rocked that extent clockwise to remove its step 225–1 from alignment and present its step 225–2 in alignment within the period of time that the control slide finger 126 receives its regular forward and return movements during machine cycling. As noted in FIG. 14, this results in the forcing of the control slide finger 126 from its last step position (225–1) to the step 225–2 position during such a sequence-starting machine cycle of operation initiated through the then free ID transaction key. As described above with respect to FIGS. 7 and 8, this transfers the sequence control slide 120 from its "first restored" position to its "second restored" position.

Said "second restored" positioning of the sequence control slide 120, it is recalled, is effective to block operation of all digit-entering-type transaction keys with the exception of the I key 28. At this time, as illustrated in FIG. 10, the upper shoulder 128 of the control slide 120 is now positioned in such a way that the depression blocking lever 132 associated with the key 28 may enter within its bifurcation and thus move freely downwardly therepast as the key 28 is depressed its full extent. Rocking of the associated sequence selector lever 155 (FIG. 11) takes place at this "key depression" time, aligning its upper rear stud 162 for pick-up by the associated camming foot 206 during regular forward movement of the lever-positioning slide 200. This, through the lever lower tail portion 161 and sector stud 221 arrangement, as further illustrated in FIG. 12, rocks the sequence selector sector 215 for now bringing into alignment with the control slide finger 126 the stopping surface of its next-to-last step 225–4. A transfer of the sequence control slide 120 from its "second restored" position to its "fourth restored" position is thus effected under the I transaction key 28, which forces the slide finger 126 from its last step (225–2) position to the new (225–4) step position (FIG. 14). Of course, when once the selector lever positioning slide 200 restores rearwardly and has no camming foot control over the sector 215, the interconnected spring 217 is free to impart that slight counter-clockwise movement to the sector 215 permitted for also engaging the upper surface of the new step with the slide finger 126; that is, cornering such finger at such new step as above discussed. The precise rocking of the sequence selector sector 215 at this time is, of course, determined by the overall height of the camming foot 206, which, for the sake of the instant disclosure of the invention, is of that magnitude to always align the fourth step 225–4 of the sector 215 with the control slide finger 126. The height of the foot 206, as well as of the remaining camming feet 207, 208, and 209, may vary as desired for imparting any number of different extents of rocking to the associated sector 215. For this disclosure, the overall height of the foot 206 is held at .297 of an inch, which is sufficient to present the sector 215 at that position which has its fourth step 225–4 in controlling relationship with respect to restored positioning of the associated sequence control slide 120.

While at this step 225–4 restored position, the sequence control slide 120 is now effective—that is, has its shoulders 128 to 131 arranged—to permit the next machine cycle of operation to be initiated through any one of the COST, add, and subtract transaction keys 29, 30, and 31, respectively. In each instance, the machine operation initiated through the add and subtract transaction keys 30 and 31 (FIGS. 1, 2, and 7) will force the slide finger 126 from its step 225–4 position to the next higher step 225–5 position, in turn enabling the sequence control slide 120 to be finalized in positioning at its "fifth restored" position during machine cycling thereunder. Depression of the Add transaction key 30 will, of course, pre-condition the associated selector lever 157 for later pick-up by the camming foot 208, which is of that height to rock the sector 215 to its step 225–5 controlling position with respect to the finger 126. A like movement of the sector 215 is also had through depression of the Subtract transaction key 31 as it preconditions its associated selector lever 158 for sector 215 actuation under control of the associated camming foot 209. As related to the companion camming foot 206, the foot 208 may be of substantially the same size (.297 of an inch) for effectively moving the sector 215 to its next higher step position, and still a like movement of the sector 215 may be had under control of the further camming foot 209 even though it is substantially smaller in height (for example, .203 of an inch), all as permitted by the difference each of such camming feet resides from the point of rocking movement (pivot stud 190) of the sector 215.

On the other hand, machine operation under control of the COST transaction key 29 will be effective for transferring the sequence control slide 120 not from its 225–4 step position to its 225–5 step position, as just described, but rather from said 225–4 position to the next lower, 225–3, position. This happens through the camming-foot-207-controlled rocking of the associated sequence selector lever 156, which does not impart any further clockwise rocking to the associated sector 215 but rather permits the spring 217 thereof to rock it counter-clockwise from its last gained position. The instant embodiment of the invention has the camming foot 207 approximately .270 of an inch in height, which provides but an end limitation of counter-clockwise rocking of the sector 215 at this time. Sequence control slide 120 positioning under the COST transaction key 29 will thus be from the "fourth restored" position to the "third restored" position, as the slide finger 126 is forced from step 225–4 to step 225–3.

When positioned at its "third restored" position, the control slide 120 makes free for depression either of the just-described add and subtract transaction keys 30 and 31, each then dictating a rocking movement to the sector 215 which aligns its fifth step 225–5 with the slide finger 126. Under either of such keys at this time, the sequence control slide 120 will be repositioned from its last "third restored" position to a new "fifth restored" position.

Considering now the "fifth restored" positioning of the control slide 120, each of the right-hand transaction keys 28 to 31 inclusive is made free for initiating the next machine cycle of operation in the sequence. This, as is clear from FIG. 14, includes the I, COST, add, and subtract transaction keys, from which a control slide positioning to step 225–4 is had under control of the I key, from which a control slide positioning to step 225–3 is had under control of the COST key, and from which a slide positioning at step 225–5 is had under control of each of the add and subtract keys—all in the manner described in detail hereinabove.

Again, machine operation initiated through depression of the total transaction key 34 (FIG. 2) will always return the machine to a sequence-starting position, where the sequence control slide 120 is returned to its "first restored" position regardless of where it was last located. Under such type of machine operation, step 225–1 is automatically selected for alignment with the slide finger 126, as nothing is provided to prevent full counter-clockwise rocking of the sequence selector sector 215 under normal urgence of its interconnected spring 217.

*Sequence holding mechanism*

As mentioned previously, the present embodiment of the invention specifies a non-changing in sequence status during machine operations initiated either through the sub-total transaction key 33 or under the effect of the B transaction key 35. While this of course may be done in any number of ways, the method employed herein makes use of a locking arrangement for the sequence selector sector 215 whenever either of the just-mentioned transaction keys is depressed, to effectively maintain the sector 215 in that position gained under control of the selected one of the remaining transaction keys last depressed.

Referring to FIG. 4, it is seen that the sequence holding arm portion 216 of the sector 215 has its upper end notched as at 216a, there being one notch for each of the five sector steps provided, and each such notch being adapted for receiving the outer tooth portion 226a of an associated locking arm 226 therewithin. As further illustrated in FIG. 16, the locking arm 226 is rockably mounted on the stud 218 of the mounting plate 88 and is continually urged counter-clockwise by a spring 227 for normally maintaining its outer tooth portion 226a free and clear of engagement with the associated holding arm notches 216a. With such overall arrangement, operation of the arm 226 clockwise for presenting its tooth portion 226a within an aligned one of the notches 216a will effectively maintain the sequence selector sector 215 against any spring-217-urged rocking counter-clockwise during the period of time within a machine cycle that the finger 126 of the sequence control slide 120 is caused to move forwardly and from engagement with one of the steps 225–1 through 225–5. As to which one of the notches 216a the tooth portion 226a might engage, of course, depends upon the positioning of the sector 215 at the time rocking movement is had by the locking arm 226 for effecting the sector holding operation. As illustrated in FIG. 4, the rightmost one of the notches 216a will be available for receiving the tooth portion therein whenever the sector 215 is in its control slide "first restored" refining position. At this time, and for each of the remaining notches 216a representing control slide "second through fifth restored" defining positions, the actual engagement between the tooth and the notch is such that a slight degree of clockwise rocking is caused to be imparted to the sector 215, all as controlled by companion camming edges provided between each notch 216a and the outer surface of the tooth portion 216a (FIG. 17). The reason for this slight rocking of the sector 215 is simply to insure against any possible bind or obstruction between the control slide finger 126 and the associated steps 225–1 through 225–5. As will be apparent from the description now to be given, the timing of rocking of the locking arm 226 to its sector-215-holding position is immediately upon transaction key depression and prior to machine cycling; hence, while not precisely illustrated herein, having the control slide finger 126 and clear for unobstructed movement throughout its regular forward and return travel during machine operation.

Rocking of the locking arm 226 to such a holding position with respect to the sequence selector sector 215 is had immediately upon depression of the sub-total transaction key 33 as a lower stud 229 of the usual sub-total slide plate 228 (FIG. 16), caused to be shifted downwardly thereby (all in the manner described in detail in the above-mentioned Frieberg et al. United States patents), slides along a lower inclined tail portion 226b of the arm 226. This, it is clear, will impart direct rocking to the locking arm 226, and the arm 226, as per the reference patents, will then be maintained until that precise time during machine cycling designated for regular restoration of the sub-total slide plate 228.

Rocking of the locking arm 226 to such a holding position with respect to the sequence selector sector 215 also takes place immediately upon depression of the B transaction key 35. Recalling earlier description with respect to the transaction key mechanism illustrated in FIG. 3, each downward depression of the key 35, through regular shifting of the actuating link 105 thereby, imparts a precise degree of rocking movement to the machine cross shaft 108 (clockwise in FIG. 3 and counter-clockwise when viewed from the opposite side of the machine, FIG. 4). This rocking of the shaft 108 is likewise effective for moving the locking arm 226 to its holding position with respect to the sector 215, all in view of the intervening mechanism clearly illustrated in FIG. 4.

Secured to the right-hand end of the cross shaft 108, on the outer side of the right vertical frame plate 48

(FIG. 13), is a rearwardly-extending trip interlock arm 230, which, by means of a stud 231 and slot arrangement, engages the forward end of an intermediate lever 232 supported for rocking movement on a side frame stud 233. The rear end of the intermediate lever 232 operably engages a forwardmost stud 235 of an associated rocker lever 234 mounted on a further side frame stud 236, with the rear end of the lever 234 being connected to a link 237 extending upwardly therefrom and to one end of a trip interlock lever 238 rockably supported by a mounting-plate-88-carried stud 239. The other end of the trip interlock lever 238 is aligned immediately above an actuating stud 240 on the locking arm 226 (see also FIG. 16) and is normally maintained ineffective with respect thereto by a spring 241 urging the rocker lever 234 clockwise and hence, through the link 237, the trip interlock lever 238 likewise clockwise. With this overall mechanism, each transaction-key-35-controlled rocking of the cross shaft 108 is effective to overcome the spring 241 and lift the link 237 upwardly so as to, through counter-clockwise rocking of the trip interlock lever 238 thereby, likewise rock the locking arm 226 to its sector-215-holding position; that is, with its outer tooth portion 226a engaged within that step-defining notch 216a of the sequence holding arm portion 216 caused to be last aligned therewith. This, of course, takes place prior to machine cycling and will be maintained until, as described previously, the cross shaft 108 is permitted to return to home upon latch arm 112 release of the actuating link 105 (FIG. 3), which is after the time provided during machine cycling for enabling the sequence selector sector 215 to be moved to a new slide finger 126 controlling position.

*Modified sequence*

As mentioned previously, while the preferred embodiment of the invention as disclosed herein defines an overall sequence wherein the camming feet 206, 207, 208, and 209 of the selector lever positioning slide 200 are of those heights to force the finger portion 126 of the sequence control slide 120 to the sector 215 step 225–4, 225–3, 225–5, and 225–5 positions, respectively (FIG. 14), each making a specified one or more of the transaction keys available for initiating the next "in-sequence" cycle of operation, new and different arrangements of transaction key availability within the sequence may quickly and simply be had through an exchanged selector lever positioning slide 200 having camming feet 206 to 209 inclusive of heights different from those last employed. As an example, and as representatively illustrated in FIG. 18, a change in height of the camming foot 206 from its above-mentioned .297 of an inch to .359 of an inch will direct that machine operation following the one under control of the I transaction key 28 to be that type permitted by the "fifth restored" positioning of the sequence control slide 120 rather than "fourth restored" positioning thereof. From the charting of FIG. 18, this difference in height (b dimension) of the camming foot 206 will align the sector step 225–5 with respect to the control slide finger portion 126 rather than, as above, the step 225–4 with respect thereto. Changing the height of the camming foot 206 still further to either of the shorter dimensions noted (.156 and .234) will in a like manner have a controlling effect on the next machine operation permitted within the overall sequence, being those designated in FIG. 14 for the remaining sector steps 225–2 and 225–3 positioning—"second restored" and "third restored," respectively, of the sequence control slide 120. Thus, while depression of the I transaction key 28 within the precise sequence specified for the instant disclosure of the invention will, in effect, dictate the next machine operation in the sequence to be initiated through either of the COST, add, or subtract transaction keys 29, 30, and 31, respectively, it is to be herein understood that the key 28 could just as well dictate the next machine operation in the sequence to be initiated through other of the transaction keys alone or through a selected one of specified combinations thereof.

A like change in the height of any one of the remaining camming feet 207, 208, and 209 of the slide 200 will have the same effect of changing through which transaction key alone or which one or several available transaction keys the next digit-entering-type machine operation within the sequence may be initiated. Further examples departing from the instant embodiment of the invention would permit the COST transaction key 29 to enforce the next machine operation through either a "second restored" or a "fourth restored" positioning of the sequence control slide 120 rather than, as disclosed, the "third restored" positioning thereof; would have the add transaction key 30 select either step 225–3 or step 225–4 of the sequence selector sector 215 for controlling restoration of the control slide 120 to either its "third restored" or "fourth restored" position; and would have the subtract transaction key 31, rather than forcing the control slide finger 126 to the step 225–5 position of the sector 215, forcing it to the step 225–4 position, where the control slide 120 becomes finalized at its "fourth restored" position rather than its "fifth restored" position.

While not illustrated herein, it is clear that the upper camming edge 165a of the sequence selector lever 165 and the lower front stud 210 of the associated selector lever positioning slide 200 may likewise be quickly and easily arranged so as to align something other than step 225–2 with the control slide finger 126 during machine operation initiated through the ID transaction key 27. As is apparent from FIG. 15, a simple change in the incline of the lever edge 165a, as well as a repositioning of the stud 210 on the slide 200, will enable any one of the remaining sector steps 225–3 through 225–5 to be selected for dictating the restored positioning of the associated control slide 120. This, in addition to the wide range of selectivity permitted for each of the remaining transaction keys (FIG. 18), presents an overall mechanism which, while being extremely accurate and demanding with respect to the exact machine cycles of operation permitted within a particular sequence, is extremely flexible with respect to the initial setting-up of just what that particular sequence is to include.

*Operation*

Operation of the instant invention follows that diagrammatic representation illustrated in FIG. 2, where each of the digit-entering-type transaction keys 27, 28, 29, 30, and 31 initiates a machine operation during which the sequence mechanism provided is actuated to a state of overall control with respect to the next succeeding machine operation which may be initiated. In the precise manner described in detail hereinabove, each digit-entering machine cycle of operation will cause the sequence selector sector 215 (FIG. 4) to be rocked that extent where a selected one of its steps 225–1 through 225–5 (FIG. 14) is brought into position for stopping the associated sequence control slide 120 when it reaches any one of five restored positions. The sector 215 is positioned at this time through rocking of a selected one of the sequence selector levers 155 to 158 and 165 a precise extent to in turn have direct control over the ultimate positioning of the sector 215 during machine cycling. As to which of the sequence selector levers is effective for so determining the sector positioning depends upon which one of such digit-entering-type transaction keys has been depressed for initiating machine cycling. In each instance, as per the illustrations of FIGS. 10 through 15, the transaction key, when depressed, imparts immediate rocking to its associated sequence selector lever to that degree where it will be picked up during machine cycling by the associated one of the camming feet 206 to 209 or the stud 210 of the selector lever positioning slide 200. Upon being so picked up during regular operation of the slide 200, such one of the sequence selector levers is then further rocked that precise amount dictated by the overall height of the camming foot employed in one instance, and by the general location of the forward stud employed in the other instance, for either imparting direct rocking to the sequence selector sector 215 for new step alignment with respect to the finger portion 126 of the associated sequence control slide 120 or imparting direct control over the spring-217-urged rocking of the sector 215 for such a new step alignment—the latter being true whenever the digit-entering transaction key depressed dictates a movement of the sector 215 to a control slide stopping step located prior to that last attained, in a decreasing order of movement with respect to the numerical designation (FIG. 14) of such sector steps.

This precise positioning of the sequence selector 215 must, of course, take place during a time compatible with that during which the sequence control slide 120 (FIG. 7) is regularly moved first forwardly and then rearwardly during machine operation. This enables the slide 120 to be stopped during its rearward movement at any one of the step-defining "first through fifth restored" positions, whereat each of its upper shoulders 128, 129, 130, and 131 is positioned for either blocking or making free an associated one of the right-hand transaction keys 28 to 31 inclusive of the machine. In view of the permissible restoration of the control slide 120 to any one of five stopping positions, various combinations of blocking and clear, of course, are available for such keys, each described in detail hereinabove with respect to both the Sequence Control Mechanism and the Selector Lever Positioning Mechanism portions of the present invention.

Depression of the total transaction key 34 in and of itself is effective for returning the machine employed to a sequence-starting condition, where the control slide 120 is positioned for blocking against depression each of the digit-entering transaction keys 28 to 31 inclusive. This leaves the remaining digit-entering transaction key 27 alone free for depression in starting a new series of machine operations permitted within the sequence. Return to such a sequence-starting condition is always available through the total key 34.

Holding of the sequence stage last attained is had throughout the machine cycling initiated either under the sub-total transaction key 33 or the B transaction key 35 in conjunction with the key 33 or the total key 34. In each instance, operation of the locking arm 226 is had immediately upon depression of the keys 33 and 35 for engaging and holding the sequence selector sector 215—via its holding arm portion 216 (FIGS. 4, 16, and 17)—at its last-attained sequence control slide 120 stopping position. Continuation of digit-entering machine operations within the sequence may then regularly follow as directed by the control slide 120 last restored positioning prior to either a sub-total or a B-totalling operation, up to the time when a total machine operation is initiated for again returning the machine to its sequence-starting condition.

From this brief operational discussion of the instant invention directed at type-of-operation sequence mechanism for business machines, it is clear that, while the precise mechanism herein shown and described will admirably fulfill the objects stated, such mechanism is susceptible to various changes considered to come within the scope and spirit of the overall invention. Thus, the one form or embodiment of such invention herein disclosed is not intended to confine the invention beyond the limitations which may be imposed by the following claims.

What is claimed is:
1. Sequence mechanism for controlling the operation of a plurality of cycle-initiating members of a business machine, comprising a control member having an operation-preventing abutment associated with each of said cycle-initiating members; means for operating said control member from a last set to a next set position, whereat one or more of the said abutments thereof is positioned effective for blocking operation of its associated cycle-initiating member; a stopping finger on said control member; a sequence selector member having a plurality of stopping abutments, each alignable with said stopping finger and effective when engaged thereby for defining the next set positioning of said control member; and means actuated upon operation of each of said cycle-initiating members for moving said selector member to a position where a particular one of its stopping abutments is aligned for engagement by said stopping finger during control member operation by said operating means.

2. The sequence mechanism of claim 1 in which said operating means is actuated during each operation of the business machine for regularly operating said control member from its last to next set position thereduring.

3. The sequence mechanism of claim 1 including means dictating a positioning of said control member by said operating means where all of the said abutments thereof are positioned effective for blocking operation of the associated cycle-initiating members; a further cycle-initiating member disassociated from the said abutments of said control member; and further means actuated upon operation of said further cycle-initiating member for moving said sequence selector member to a position where said stopping finger engages an abutment thereof during control member operation by said operating means permitting associated cycle-initiating member operation at the control member next set positioning reached.

4. The sequence mechanism of claim 3 including still a further cycle-initiating member disassociated from the abutments of said control member; and means actuated upon operation of said still further cycle-initiating member for holding said sequence selector member to its last moved position where said stopping finger again engages the abutment thereof during control member operation by said operating means permitting associated cycle-initiating member operation at the control member last set positioning reached.

5. The sequence mechanism of claim 1 in which each of said cycle-initiating members is in the form of a depressible transaction key, and said operation-preventing abutment in each instance defines a shoulder portion of said control member positionable therebelow.

6. The sequence mechanism of claim 5 in which one of said sequence selector member abutments defines a next set positioning of said control member where all of the shoulder portions thereof are positioned effective for blocking depression of the associated transaction keys; means for selecting said one selector member abutment for alignment with said stopping finger for such positioning of said control member by said operating means; a further transaction key removed from any depression-blocking control by said control member shoulder portions; and further means actuated upon depression of said further transaction key for moving said sequence selector member to a position where another of its stopping abutments is aligned for engagement by said stopping finger during control member operation by said operating means.

7. The sequence mechanism of claim 1 in which the cycle-initiating members provided are aligned one after another on the business machine; said control member is mounted for shifting movement along said cycle-initiating members; said sequence selector member is mounted for rocking movement across said control member; said control finger stopping abutments are stepped surfaces of said selector member; and said moving means is effective for rocking said selector member a precise extent under control of each cycle-initiating member for presenting an associated one of the stepped surfaces thereof in the path of travel of said stopping finger during shifting movement of the control member.

8. The sequence mechanism of claim 7 in which said stepped surfaces define one edge of an aperture through said sequence selector member; and said stopping finger extends within said aperture for engagement with the selected stepped surface of said edge during each shifting movement of the control member.

9. The sequence mechanism of claim 7 in which said moving means comprises a lever member operably associated with each cycle-initiating member and each capable of rocking said sequence selector member to a particular stepped surface controlling position with respect to the next set positioning of the control member; means normally maintaining each of said lever members inactive; each of said cycle-initiating members, when operated, transferring its associated lever member from normal to a partially active position; and means for actuating each of said lever members from partially active to an active, associated cycle-initiating member defining selector member rocking position.

10. The sequence mechanism of claim 9 in which said activating means comprises an actuating abutment on each of said lever members; camming means associated with each of said actuating abutments and capable therethrough of moving each of said lever members to its active position; means for actuating said camming means to a lever member moving position with respect to said abutments; each of said lever members while maintained inactive by said maintaining means presenting its actuating abutment ineffective for lever member moving by said camming means during actuation thereof; and each of said lever members when transferred partially active through operation of the associated cycle-initiating member presenting its actuating abutment effective for lever member moving by said camming means during actuation thereof.

11. The sequence mechanism of claim 10 in which said camming means comprises a lever positioning member having an individual camming foot for each of said lever members; said positioning member is mounted for shifting movement along said lever members; said camming means actuating means is effective for shifting said positioning member that extent which enables each camming foot thereof to actuate the associated lever member to active position through engagement with the actuating abutment thereof when in its partially active position; and a plurality of actuating abutments on said sequence selector member, one for each of said lever members and each aligned for engagement thereby during lever member actuation to active position for rocking such selector member a corresponding amount.

12. The sequence mechanism of claim 9 in which said actuating means comprises an actuating abutment on each of said lever members; a lever positioning member; means for actuating said lever positioning member; camming means on said positioning member for each of said lever members and aligned for operable engagement with the actuating abutment thereof when such member is positioned in its partially active position during positioning member actuation by said actuating means; said camming means in each instance being effective for actuating its lever member through said actuating abutment thereof from partially active to a predetermined active position therefrom, and an actuating abutment on said sequence selector member for each of said lever members and engaged thereby during such camming means actuation thereof to its predetermined active position for rocking such selector member a corresponding amount.

13. The sequence mechanism of claim 12 wherein said lever positioning member is mounted for shifting movement along said lever members; each of said lever members is mounted for rocking movement; said camming means in each instance defines a foot portion of said lever positioning member forwardly inclined for imparting rocking to its lever member upon engaging the actuating abutment thereof during positioning member shifting therealong; and said foot portion in each instance is of a size for so rocking said lever member that extent which in turn rocks said sequence selector member to present a particular one of the stepped surfaces thereof in blocking alignment with the said control member stopping finger.

14. Type of operation sequence mechanism for a business machine having a plurality of selectively depressible transaction keys, comprising a control member having an abutment portion for each of said transaction keys and effective when aligned therewith for preventing depression thereof; means for operating said control member to positions corresponding to each of said transaction keys; said abutment portions being effective for blocking depression of at least one of said transaction keys during each positioning of said control member by said operating means; plural stopping means associated with said control member and each effective for dictating the positioning thereof by said operating means to one of said transaction key corresponding positions; and means actuated upon depression of each transaction key for selecting an associated one of said stopipng means to perform its said dictating function.

15. The sequence mechanism of claim 14 including a finger portion on said control member; a sequence selector member operably associated with said control member finger portion; said plural stopping means comprises stepped surfaces on said selector member corresponding to each of said transaction keys and each effective for stopping operation of said control member when engaged by the finger portion thereof; and said selecting means is effective for operating said selector member under control of each transatcion key to a position which presents the corresponding stepped surface thereof in engaging position with respect to said control member finger portion.

16. The sequence mechanism of claim 15 in which said control member is mounted for shifting movement relative to said transaction keys; said sequence selector member is mounted for rocking movement relative to said control member; said stepped surfaces of said selector member are positioned one after another relative to the direction of shifting of said control member; and said selecting means rocks said selector member in each instance an amount for moving the corresponding stepped surface thereof within the path of travel of said finger portion during control member shifting by said operating means.

17. The sequence mechanism of claim 15 including a sequence-ending transaction key on said business machine removed from any depression control by said control member; a further stepped surface on said selector member corresponding to said sequence-ending transaction key and effective when engaged by said finger portion for stopping operation of the control member at a position presenting said abutment portions thereof effective for blocking depression of all of said plurality of transaction keys; and means removed from said selecting means for operating said selector member under control of said sequence-ending transaction key to a position which presents such further stepped surface thereof in engaging position with respect to said control member finger portion.

18. The sequence mechanism of claim 17 including a sequence-starting transaction key removed from any depression control by said control member; and further selecting means effective for operating said selector member under control of said sequence-starting transaction key from the further stepped surface engaging position to a selected one of the plurality of transaction key stepped surface engaging positions with respect to said control member finger portion.

19. The sequence mechanism of claim 18 including interlock means for preventing depression of said sequence-starting transaction key; means presenting said interlock means effective during each control member positioning by said plurality of transaction keys; and means actuated by said control member when positioned by said sequence-ending transaction key for overcoming said presenting means and releasing said interlock means.

20. The sequence mechanism of claim 16 in which said selecting means comprises multiple cam means effective for rocking said selector member to each of said stepped surface positions relative to the path of travel of said finger portion; a lever member for each of said transaction keys and each movable into position for operating engagement with said multiple cam means upon associated transaction key depression; and transfer means between each of said lever members and said selector member for imparting to the selector member a degree of rocking movement corresponding to lever member operation by said multiple cam means in each instance.

21. The sequence mechanism of claim 20 including an actuating abutment on each of said lever members; said multiple cam means comprises a selector lever positioning slide having a camming foot portion associated with each of said actuating abutments and each effective for operating the lever member thereof a precise amount when engaged therewith; means for operating said positioning slide along said lever members; yielding means normally positioning each of said lever members for maintaining its actuating abutment from engaging position with the associated camming foot portion during positioning slide operation therealong; and each of said transaction keys when depressed overcoming said yielding means and moving its lever member to a position presenting the actuating abutment thereof in position for engagement by the associated camming foot portion during positioning slide operation therealong.

22. The sequence mechanism of claim 21 in which said transfer means comprises a selector member actuating tail on each of said lever members; and a plurality of abutments on said selector member, one corresponding to each of said stepped surfaces thereof and each aligned for engagement by an associated actuating tail during lever member operation for rocking the selector member a precise amount therewith.

References Cited
UNITED STATES PATENTS

| | | | |
|---|---|---|---|
| 2,644,637 | 7/1953 | Butler | 235—60.49 |
| 2,698,139 | 12/1954 | Goodbar et al. | 235—130 |
| 2,760,722 | 8/1956 | Frieberg et al. | 235—60.31 |
| 2,836,355 | 5/1958 | Banik et al. | 235—60.47 |
| 2,981,467 | 4/1961 | Jones | 235—60.47 |
| 3,181,784 | 5/1965 | Becker | 235—2 |
| 3,348,769 | 10/1967 | Busch | 235—60 |

STEPHEN J. TOMSKY, *Primary Examiner.*